(12) United States Patent
Oshima

(10) Patent No.: US 11,853,636 B2
(45) Date of Patent: Dec. 26, 2023

(54) DISPLAY APPARATUS, DISPLAY METHOD, MEDIUM, AND DISPLAY SYSTEM

(71) Applicant: Yoshiaki Oshima, Kanagawa (JP)

(72) Inventor: Yoshiaki Oshima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 46 days.

(21) Appl. No.: 17/409,820

(22) Filed: Aug. 24, 2021

(65) Prior Publication Data

US 2022/0066728 A1 Mar. 3, 2022

(30) Foreign Application Priority Data

Aug. 27, 2020 (JP) .................. 2020-143917

(51) Int. Cl.
*G06F 3/14* (2006.01)
*G06F 3/0482* (2013.01)
(Continued)

(52) U.S. Cl.
CPC .......... *G06F 3/1446* (2013.01); *G06F 3/0482* (2013.01); *G06F 3/04883* (2013.01); *G06F 3/1415* (2013.01); *G06V 30/36* (2022.01)

(58) Field of Classification Search
CPC .... G06F 1/1641; G06F 1/1647; G06F 1/1698; G06F 3/0481; G06F 3/0482; G06F 3/04845; G06F 3/04883; G06F 3/1415; G06F 3/1423; G06F 3/1446; G06F 2203/04803; G06F 2203/04806; G06V 30/36; G09G 2354/00; G09G 2356/00
See application file for complete search history.

(56) References Cited

U.S. PATENT DOCUMENTS 8,917,957 B2 12/2014 Hirota
10,180,759 B2 1/2019 Yamamoto et al.
(Continued)

FOREIGN PATENT DOCUMENTS

JP 2000-047824 2/2000
JP 5294818 9/2013
(Continued)

OTHER PUBLICATIONS

Extended European Search Report dated Jan. 19, 2022 in European Patent Application No. 21193041.7, 13 pages.
(Continued)

*Primary Examiner* — Nelson M Rosario
(74) *Attorney, Agent, or Firm* — XSENSUS LLP

(57) ABSTRACT

A display apparatus that displays handwritten data includes a display, a memory, and a processor configured to execute receiving as input the handwritten data; detecting one or more secondary display apparatuses; displaying, in a case where the one or more secondary display apparatuses are detected by the detecting, on the display of the display apparatus, an operation command related to a function of displaying data by using the display apparatus and the one or more secondary display apparatuses, based on the handwritten data received by the receiving; and predetermined processing related to the function, in response to receiving an operation performed by a user with respect to the operation command.

17 Claims, 45 Drawing Sheets

(51) Int. Cl.
  *G06F 3/04883* (2022.01)
  *G06V 30/32* (2022.01)

(56) References Cited

U.S. PATENT DOCUMENTS

| | | |
|---|---|---|
| 10,496,221 B2 | 12/2019 | Oshima et al. |
| 2007/0106950 A1 | 5/2007 | Hutchinson et al. |
| 2014/0019905 A1 | 1/2014 | Kim et al. |
| 2017/0180988 A1* | 6/2017 | Kim ................... H04L 63/0861 |
| 2017/0316761 A1 | 11/2017 | Furukawa et al. |
| 2018/0024806 A1 | 1/2018 | Fujino et al. |
| 2022/0374142 A1* | 11/2022 | Kasatani ............... G06F 3/0416 |

FOREIGN PATENT DOCUMENTS

| | | |
|---|---|---|
| JP | 2014-123159 A | 7/2014 |
| JP | 2016-103174 A | 6/2016 |
| JP | 2016-206978 A | 12/2016 |
| JP | 2017-16314 A | 1/2017 |
| JP | 2018-17758 A | 2/2018 |
| JP | 2019-220155 | 12/2019 |

OTHER PUBLICATIONS

Japanese Office Action dated Sep. 19, 2023, in corresponding Japanese Application No. 2020-143917, 7pp.

* cited by examiner

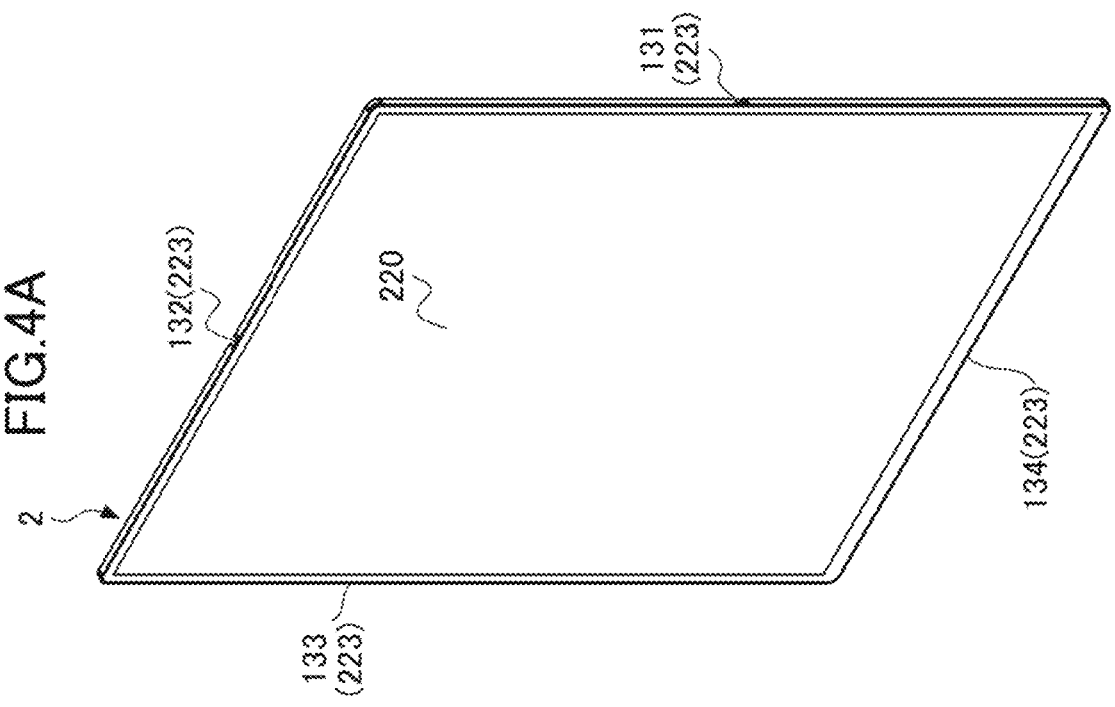
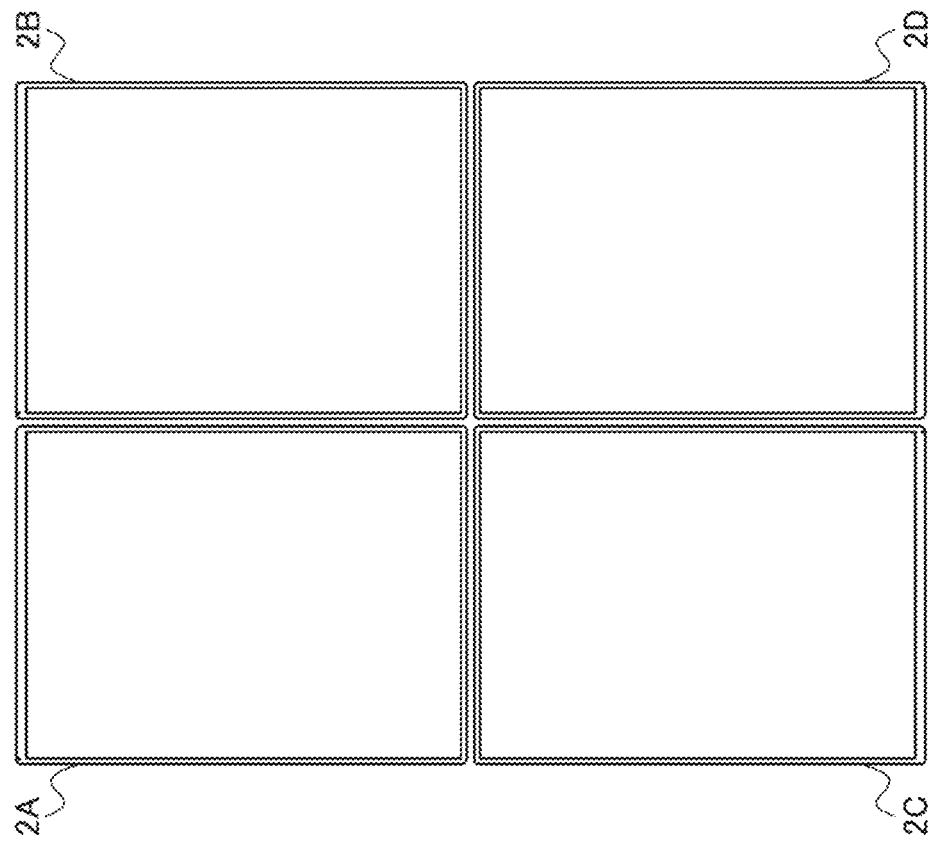

FIG.6B

| PAGE DATA ID | START TIME | END TIME | STROKE ARRAY DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.6C st003 st002 st001

| STROKE DATA ID | START TIME | END TIME | COLOR | WIDTH | COORDINATE ARRAY DATA ID |
|---|---|---|---|---|---|
| s001 | 20130610102502 | 20130610102505 | 000000 | 2 | c001 |
| s002 | 20130610102612 | 20130610102615 | 000000 | 3 | c002 |
| s003 | 20130610102704 | 20130610102712 | 000000 | 1 | c003 |
| ... | ... | ... | ... | ... | ... |

FIG.6D

| X COORDINATE | Y COORDINATE | TIME DIFFERENCE | PEN PRESSURE |
|---|---|---|---|
| 10 | 10 | 100 | 255 |
| 12 | 10 | 200 | 255 |
| 14 | 12 | 300 | 255 |
| ... | ... | ... | ... | c001
c002
c003

| DISPLAY DEVICE | PAGE NUMBER | DISPLAY RANGE |
|---|---|---|
| A | 1 | (ANY RANGE) |
| B | ″ | ″ |
| C | ″ | ″ |
| D | ″ | ″ |

FIG.7B

| 2A | 2B |
|---|---|
| A<br>p1<br>(ANY RANGE) | B<br>p1<br>(SAME AS A) |
| C<br>p1<br>(SAME AS A) | D<br>p1<br>(SAME AS A) |

| DISPLAY DEVICE | PAGE NUMBER | DISPLAY RANGE |
|---|---|---|
| A | 1 | (ANY RANGE) |
| B | 2 | (ANY RANGE) |
| C | 3 | (ANY RANGE) |
| D | 4 | (ANY RANGE) |

FIG.7D

| 2A | 2B |
|---|---|
| A<br>p1<br>(ANY RANGE) | B<br>p2<br>(ANY RANGE) |
| C<br>p3<br>(ANY RANGE) | D<br>p4<br>(ANY RANGE) |

2C, 2D

FIG.7E
| DISPLAY DEVICE | PAGE NUMBER | DISPLAY RANGE |
|---|---|---|
| A | 1 | UPPER LEFT |
| B | 〃 | UPPER RIGHT |
| C | 〃 | LOWER LEFT |
| D | 〃 | LOWER RIGHT |
603
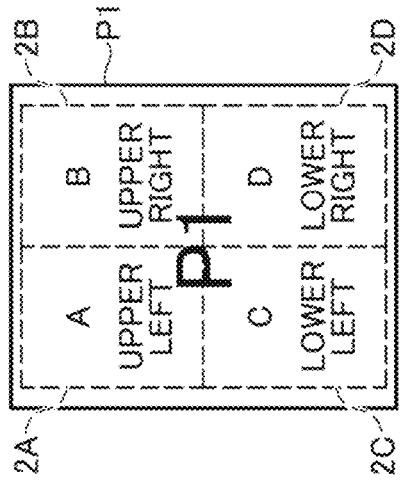
FIG.7F
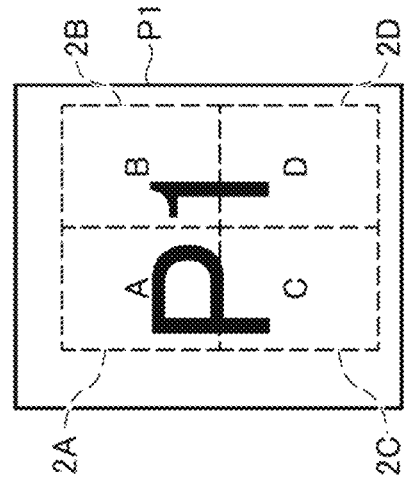
FIG.7G

FIG.14

| TERMINAL ID | ARRANGED POSITION | IP ADDRESS |
|---|---|---|
| A | (1,1) | 1.1.1.1 |
| B | (1,2) | 1.1.1.2 |
| C | (2,1) | 1.1.1.3 |
| D | (2,2) | 1.1.1.4 |

FIG.16

| EXAMPLE OF OPERATION COMMAND DEFINING DATA (IN CASE OF NO SELECTED OBJECT) |
|---|
| 701 — Name="議事録テンプレートを読み込む" String="テンプレート"<br>Command="ReadFile https://%username%:%password%@server.com/template/minutes.pdf" MD="OFF" |
| 702 — Name="議事録フォルダーに保存する" String="保存"<br>Command="WriteFile https://%username%:%password%@server.com/minutes/%machinename%_%yyyy-mm-dd%.pdf" MD="OFF" |
| 703 — Name="印刷する" String="プリント"<br>Command="PrintFile https://%username%:%password%@server.com/print/%machinename%_%yyyy-mm-dd%.pdf" MD="OFF" |

FIG.18

| |
|---|
| 711 — Name="クローン" String="クローン" String="おなじ" Command="MultiDisplay.Set.Clone" MD="ON" |
| 712 — Name="マルチページ" String="マルチ" String="ならべる" Command="MultiDisplay.Set.MultiPage" MD="ON" |
| 713 — Name="タイリング" String="マルチ" String="タイル" String="れんけつ" Command="MultiDisplay.Set.Tiring" MD="ON" |

FIG.24A
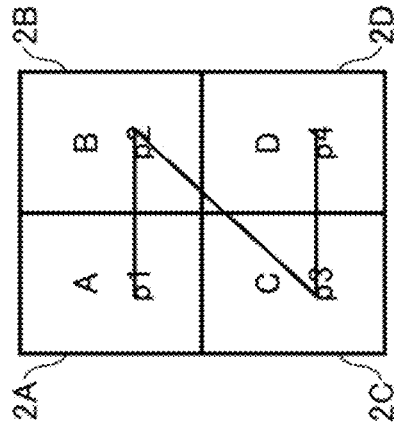
FIG.24B
FIG.24C
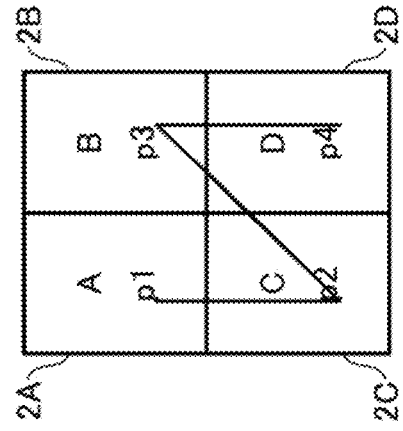
FIG.24D

FIG.25

| |
|---|
| Name="Z字順で兼示" String="じゅんばん"<br>Command="MultiDisplay.Set. ZDirecton " MD="ON" |
| Name=" 逆N字順で兼示" String="じゅんばん"<br>Command="MultiDisplay.Set. NReverseDirecton " MD="ON" |

714 ⏌
715 ⏌

FIG.27A
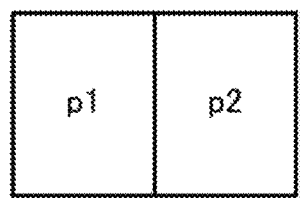
FIG.27B
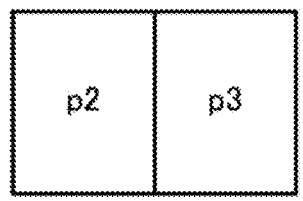
FIG.27C
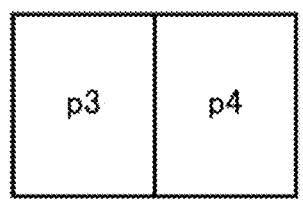
FIG.27D
| DISPLAY DEVICE | PAGE NUMBER (ONE-PAGE TURNING) | PAGE NUMBER (TWO-PAGE TURNING) | DISPLAY RANGE |
|---|---|---|---|
| A(1,1) | 1→2 | 1→3 | (ANY RANGE) |
| B(1,2) | 2→3 | 2→4 | (ANY RANGE) |
606

FIG.28

716 — Name="1ページ送り" String="おくり"
Command="MultiDisplay.Set.1PageSend" MD="ON"

717 — Name="見開き送り" String="おくり"
Command="MultiDisplay.Set.SpreadSend" MD="ON"

FIG.30

718 — Name="拡大する(200%)" String="大きく"
Command="ExpandingTo200" MD="OFF"

719 — Name="拡大する(400%)" String="大きく"
Command="ExpandingTo400" MD="OFF"

720 — Name="拡大する(110%)" String="ちょっと" String="少し"
Command="ExpandingTo110" MD="OFF"

721 — Name="拡大する(120%)" String="ちょっと" String="少し"
Command="ExpandingTo120" MD="OFF"

FIG.33

722 — Name="A1で表示" String="A1"
Command="MultiDisplay.SetTiming" Command="A1size" MD="OFF"

723 — Name="A1ページを作成" String="A1"
Command="MultiDisplay.SetTiming" Command="A1sizeMulti" MD="OFF"

DISPLAY APPARATUS, DISPLAY METHOD, MEDIUM, AND DISPLAY SYSTEM

CROSS-REFERENCE TO RELATED APPLICATION

The present application is based upon and claims the benefit of priority under 35 U.S.C. § 119 of Japanese Patent Application No. 2020-143917 filed on Aug. 27, 2020, the entire contents of which are hereby incorporated by reference.

BACKGROUND OF THE INVENTION

1. Field of the Invention

The present disclosure relates to a display apparatus, a display method, a medium, and a display system.

2. Description of the Related Art

A display apparatus that captures, as coordinate points, handwritten data such as characters and figures written by hand by the user using a fingertip or pen, to display the data in real time, has been known. Some of such display apparatuses are capable of displaying a screen of a connected personal computer (PC) or a document held in the PC. Also, these display apparatuses are also capable of communicating with remote display apparatuses to share a screen among the multiple display apparatuses. A screen displayed on a display apparatus is saved as a page; therefore, the screen can be later reproduced on the display apparatus, or delivered to a PC or the like.

In some cases, such a display apparatus may be installed with editing functions that allow the user to modify or delete handwritten data (see, for example, Japanese Laid-Open Patent Application No. 2010-134876). This patent application discloses a display apparatus that allows the user to input a command with a gesture to edit characters, symbols, or images.

However, with conventional techniques, there has been a problem in that a function of displaying data using multiple display apparatuses cannot be operated through handwritten data. Here, "displaying data using multiple display apparatuses" means displaying data by using what-is-called a multi-displaying function. By using the multi-displaying function, it becomes possible for the user to display data in an operation mode set by the user on multiple displays. The operation mode includes Cloning (every display displays the same page), Multi-paging (each display displays any page), Tiling (multiple displays display one page), and the like. In the case where the user wants to display data in one of the operation modes or wants to switch to another operation mode, on a conventional display apparatus, the user needs to perform operations that are different from an operation of inputting handwritten data.

In view of the problem described above, it is an object of the present invention to provide a display apparatus on which the user can manipulate a function of displaying data that uses multiple display apparatuses through handwritten data.

SUMMARY OF THE INVENTION

In view of the above problems, according to the present invention, a display apparatus that displays handwritten data includes a display, a memory, and a processor configured to execute receiving as input the handwritten data; detecting one or more secondary display apparatuses; displaying, in a case where the one or more secondary display apparatuses are detected by the detecting, on the display of the display apparatus, an operation command related to a function of displaying data by using the display apparatus and the one or more secondary display apparatuses, based on the handwritten data received by the receiving; and predetermined processing related to the function, in response to receiving an operation performed by a user with respect to the operation command.

BRIEF DESCRIPTION OF DRAWINGS

FIGS. 4A and 4B are diagrams illustrating a configuration of an example of a display apparatus;

FIGS. 6B to 6D are diagrams schematically illustrating page data, stroke array data, and coordinate array data;

FIGS. 7A to 7G are diagrams illustrating definition information stored in a definition information storage unit;

FIG. 14 is a diagram illustrating an example of arrangement information generated by a configuration detection unit;

FIG. 16 is a diagram illustrating an example of operation command definition data held in an operation command processing unit;

FIG. 18 is a diagram illustrating an example of operation command definition data for displaying operation commands related to multi-displaying by a display control unit;

FIGS. 24A to 24D are diagrams illustrating definition information on operation commands referred to as "display in Z-shaped order" and "display in inverted-N-shaped order";

FIG. 25 is a diagram illustrating an example of operation command definition data for displaying operation commands related to multi-displaying by a display control unit;

FIGS. 27A to 27D are diagrams illustrating operation commands referred to as "one-page turning" and "two-page turning";

FIG. 28 is a diagram illustrating an example of operation command definition data for displaying operation commands related to multi-displaying by a display control unit;

FIG. 30 is a diagram illustrating an example of operation command definition data for displaying operation commands related to multi-displaying by a display control unit;

FIG. 33 is a diagram illustrating an example of operation command definition data for displaying operation commands related to multi-displaying by a display control unit;

DETAILED DESCRIPTION OF THE EMBODIMENTS

In the following, as embodiments and application examples of the present invention, a display apparatus and a display method executed by the display apparatus will be described with reference to the drawings. According to an embodiment, a display apparatus on which the user can manipulate a function of displaying data that uses multiple display apparatuses through handwritten data, can be provided.

Application Example 1

<Comparative Techniques>

First, with reference to FIG. 1, operation modes of a multi-displaying function will be described. FIGS. 1A to 1C are diagrams illustrating how data is displayed in some operation modes of a multi-displaying function. Note that in FIGS. 1A to 1C, a method of enabling a multi-displaying function in a general-purpose operating system will be described. Here, Windows 10 (registered trademark) is taken as an example to describe a case where there are four displays. Note that it is assumed that each display apparatus 2 has a display, and the number of displays is the same as the number of the display apparatuses 2. Also, for the sake of simplifying the description, an item of data displayed on a display on one screen will be referred to as one page, and the data is managed units of pages.

Figure 1A:
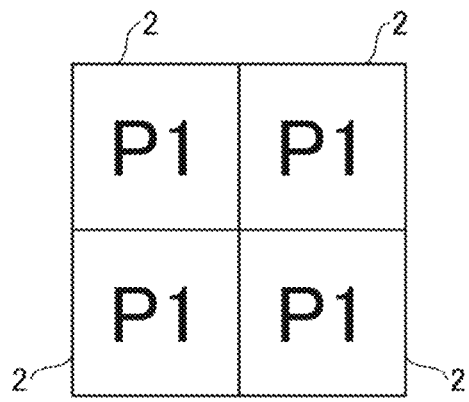
FIGS. 1A to 1C are diagrams illustrating how data is displayed in some operation modes of a multi-displaying function.

FIG. 1A is a diagram illustrating an operation mode referred to as Cloning. In the mode of Cloning, the same page is displayed on every display.

Figure 1B:
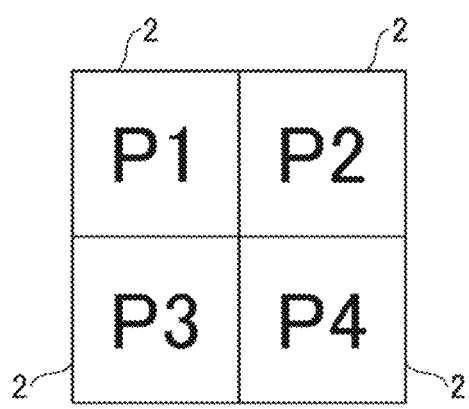

FIG. 1B is a diagram illustrating an operation mode referred to as Multi-paging. In the mode of Multi-paging, different pages are displayed on the respective displays.

Figure 1C:
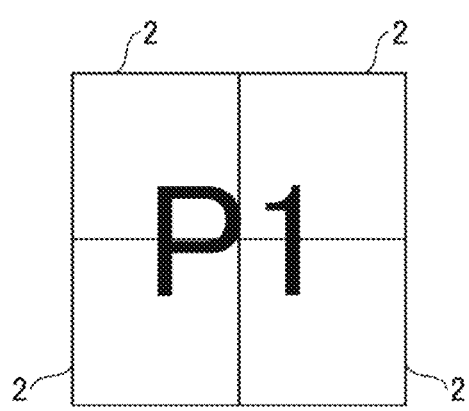

FIG. 1C is a diagram illustrating an operation mode referred to as Tiling. In the mode of Tiling, one page is displayed over the entirety of the displays.

A method performed by the user for enabling the multi-displaying function or switching the operation mode in a comparative technique to be compared with the present embodiment, will be described.

In the case where the user is going to enable the multi-displaying function, or in the case where the user is going to change the operation mode in a state of the multi-displaying function being enabled, in the comparative technique, the user needs to perform the following operations. Right-click->click "display settings"->select "enlarge" or "duplicate" from a pull-down menu on each of the multiple display->click "apply".

As such, in the comparative technique, in the case of enabling the multi-displaying function or changing the operation mode, there are many operations and steps to be done, and the screen operations are complicated. Also, in the case where the user wants to display data in one of the operation modes or wants to perform switching among the operation modes, on a conventional display apparatus, the user needs to perform operations that are different from an operation of inputting handwritten data.

<Enabling Multi-Displaying Function in Present Embodiment>

Figure 2A:
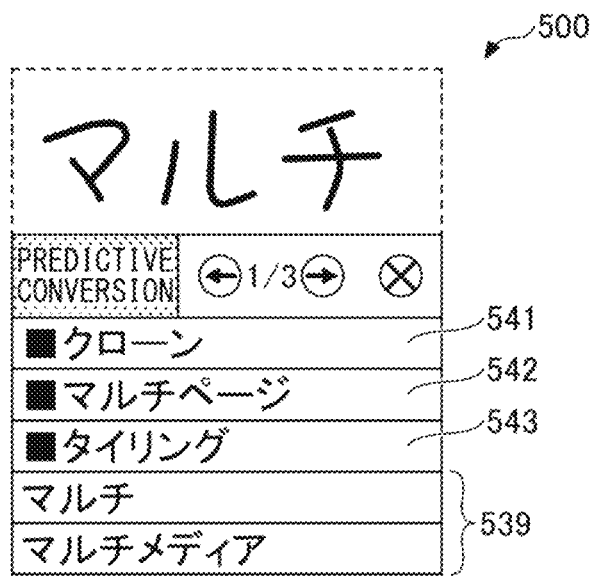
FIGS. 2A and 2B are diagrams illustrating examples of operation guides displayed based on handwritten data written by hand by the user.

Next, with reference to FIG. 2, enabling the multi-displaying function or switching the operation mode in the present embodiment will be described. FIG. 2A is a diagram illustrating an example of an operation guide 500 displayed based on handwritten data written by hand by the user. The display apparatus 2 in the present embodiment displays, (i) in the case where another display apparatus 2 close to the display apparatus is detected, and (ii) in the case where a string recognized by a handwriting recognition technique matches a defined keyword for enabling the multi-displaying or changing the operation mode, operation commands for enabling the multi-displaying or changing the operation mode on the operation guide 500.

In FIG. 2A, the user has written by hand a Japanese word meaning "multi" in English. The Japanese word meaning "multi" matches a defined keyword for enabling the multi-displaying or changing the operation mode; therefore, on the operation guide 500, operation commands 541 to 543 for enabling the multi-displaying or changing the operation mode are displayed in words in Japanese that mean "Cloning" 541, "Multi-paging" 542, and "Tiling" 543 in English, respectively. By selecting one of these, the user can enable the multi-displaying function or change the operation mode.

Note that in the case where the display apparatus 2 detects another display apparatus 2, the multi-displaying function can also be enabled automatically. In this case, the display apparatus 2 displays data in a default operation mode.

Figure 2B:
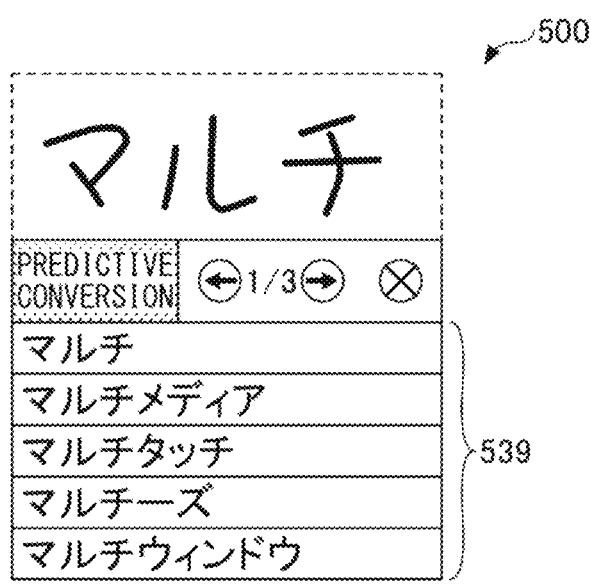

As such, by writing by hand a defined keyword for the multi-displaying, the user can easily enable the multi-displaying function or change the operation mode. The provider or the user of the display apparatus 2 can set in advance defined keywords that can be understood intuitively. For example, the name of an operation mode or an aspect of displaying may be set as a defined keyword. As illustrated in FIG. 2B, in the case where no other display apparatus 2 is detected, the operation command related to the multi-displaying are not displayed on the operation guide 500 even though the user has written a Japanese word meaning "multi" by hand. In FIG. 2B, only candidate strings 539 are displayed. In this way, the operation guide 500 can be used effectively, such that displaying of operation commands that are not selectable is suppressed.

Therefore, the number of operations and steps required for enabling the multi-displaying function or changing the operation mode can be reduced, and the degrees of freedom of an operation menu increase; therefore, the design and the operability can be improved. Only operation commands that match a defined keyword written by hand by the user are displayed; therefore, displaying of operation commands that would be not desired by the user can be excluded. In this way, icons, deeply hierarchical operation menus, and the like become unnecessary, and thereby, the degrees of freedom when designing operation menus increase.

Terminology

An input unit simply needs to be a unit that allows the user to specify coordinates on a touch panel, so as to perform writing by hand. For example, pens, human fingers and hands, and rod-shaped members may be used. A series of operations in which the user presses the input unit against a display, moves it continuously, and then, releases it from the display, is referred to as a stroke. Stroke data is information displayed on the display based on a trajectory of coordinates input through the input unit. The stroke data may be interpolated as appropriate. Data written by hand with strokes is referred to as stroke data. Handwritten data is data having one or more items of stroke data. A displayed item displayed on a display based on stroke data is referred to as an object.

The outer edge of a display apparatus means a part along the outer periphery of the display apparatus. In the case where the shape of a display apparatus is polygonal, the outer edge corresponds to the sides that form this polygon. However, the shape of the outer edge of the display apparatus may be circular or an oval.

The perimeter of the display apparatus means the outward perimeter of the display apparatus. It can also be termed as a region along the outer edge.

Displaying data using multiple display apparatuses means displaying data items having a certain relationship (the same page, different pages in one file, etc.) by multiple display apparatuses. Note that the display apparatus may be integrated, attachable/detachable, or connectable via a cable, with a display. Therefore, displaying data using multiple display apparatuses may be referred to as displaying data using the multiple displays. In the present embodiment, a function of displaying data using multiple display apparatuses may also be described with a term of "multi-displaying".

Executing predetermined processing related to a function means displaying data using multiple display apparatuses in an aspect that corresponds to an operation command (executing the multi-displaying function).

"Controlling data to be displayed on a secondary display apparatus according to an operation command" means requesting a sub-display to display a display according to an operation mode of the multi-displaying. In the present embodiment, the request includes a page and a display range according to the operation command.

An operation command presents an image for executing a specific process defined in advance (a predetermined process) in response to directly or indirectly receiving an operation performed by the user. In other words, an operation command is a displayed component as one of the displayed elements constituting a screen, and in response to directly or indirectly receiving an operation performed by the user, executes a predetermined process. The operation command may be substituted with a character, checkbox, text entry, button, or icon to present an operation. Also, the operation command may receive a press operation performed by the user in the case of using an input unit, and may be implemented to execute a predetermined process in response to a press operation.

<Example of External Appearance of Pen>

Figure 3:
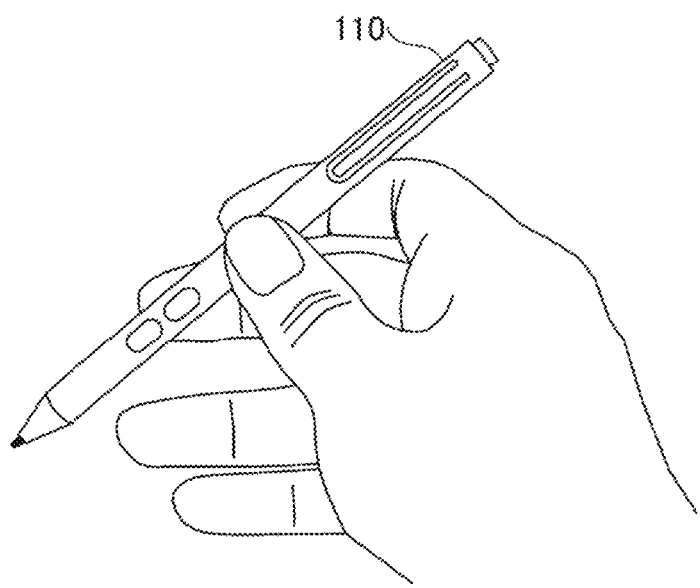
FIG. 3 is an example of a perspective view of a pen.

FIG. 3 illustrates an example of a perspective view of a pen 2500 used for writing by hand. FIG. 3 illustrates an example of a multi-functional pen 2500. The pen 2500 that has a power supply built in, and can transmit instructions to the display apparatus 2 is referred to as an active pen (whereas a pen without a built-in power supply is referred to as a passive pen). The pen 2500 in FIG. 3 has physical switches that include one at the tip of the pen, one at the tail of the pen, and two on the side surface of the pen, where the one at the tip is provided for writing, the one at the tail is provided for erasing, and the two on the side surface are provided for assigning user functions. The pen 2500 in the present embodiment has a non-volatile memory, and stores a pen ID that is not duplicate with those of the other pens.

Note that if using a pen having such switches, operational steps of the display apparatus 2 performed by the user can be reduced. Although a pen having switches is normally an active pen, if adopting an electromagnetic induction scheme, even a passive pen without a built-in power supply can generate power only with an LC circuit, and hence, a passive pen adopting an electromagnetic induction scheme can be a pen having switches. A pen having switches that adopts an optical scheme, infrared scheme, or electrostatic capacitance scheme other than an electromagnetic induction scheme, is an active pen.

Note that the hardware configuration of the pen 2500 is assumed to be substantially the same as that adopted in a typical control scheme implemented with communication functions and a microcomputer. The input scheme of coordinates with the pen 2500 includes an electromagnetic induction scheme, an active electrostatic coupling scheme, and the like. Also, the pen 2500 may have functions such as pen pressure sensing, tilt sensing, and a hover function (displaying a cursor before the pen touches).

<Example of Arrangement of Display Apparatuses>

FIG. 4A is a perspective view of the display apparatus 2 in the present embodiment. One of the features of the display apparatus 2 is that the thickness is thin. According to the present embodiment, by designing the display apparatus 2 to have a thin shape and a light weight, even if using a display 220 that has a large size measured in units of inches, a display product that is superior in portability can be produced. Also, another feature of the display apparatus 2 in the present embodiment is that the backside is completely flat. Therefore, for example, the display apparatus 2 can be placed flat on a desk, and thereby, multiple persons can participate in a discussion surrounding the display apparatus 2. Also, the display apparatus 2 can receive inputs with multiple pens 2500 so as to allow multiple persons to perform writing at the same time. Further, both the main body of the display apparatus 2 and the pen 2500 may be dust-proof and water-proof so that the display apparatus 2 can be used outdoors.

The display apparatus 2 includes multiple infrared I/F 223 for transmitting and receiving information with neighboring display apparatuses 2. On the right side surface, upper side surface, left side surface, and lower side surface of the display apparatus 2, infrared sensor windows 131, 132, 133, and 134 are provided, respectively, for the infrared I/F 223 to transmit and receive infrared signals.

FIG. 4B illustrates four display apparatuses 2 (2A, 2B, 2C, and 2D) each in a state of being oriented longer than it is wide, and together in a state of being connected in two columns by two rows. The four display apparatuses 2 can also be connected in a state of being oriented wider than it is long. The infrared sensor windows 131, 132, 133, and 134 are formed around the center of each side surface so as to be capable of transmitting and receiving infrared rays.

Note that the four display apparatuses 2 arranged in a state as in FIG. 4B may be collectively referred to as a display system 100.

<Hardware Configuration of Device>

Figure 5:
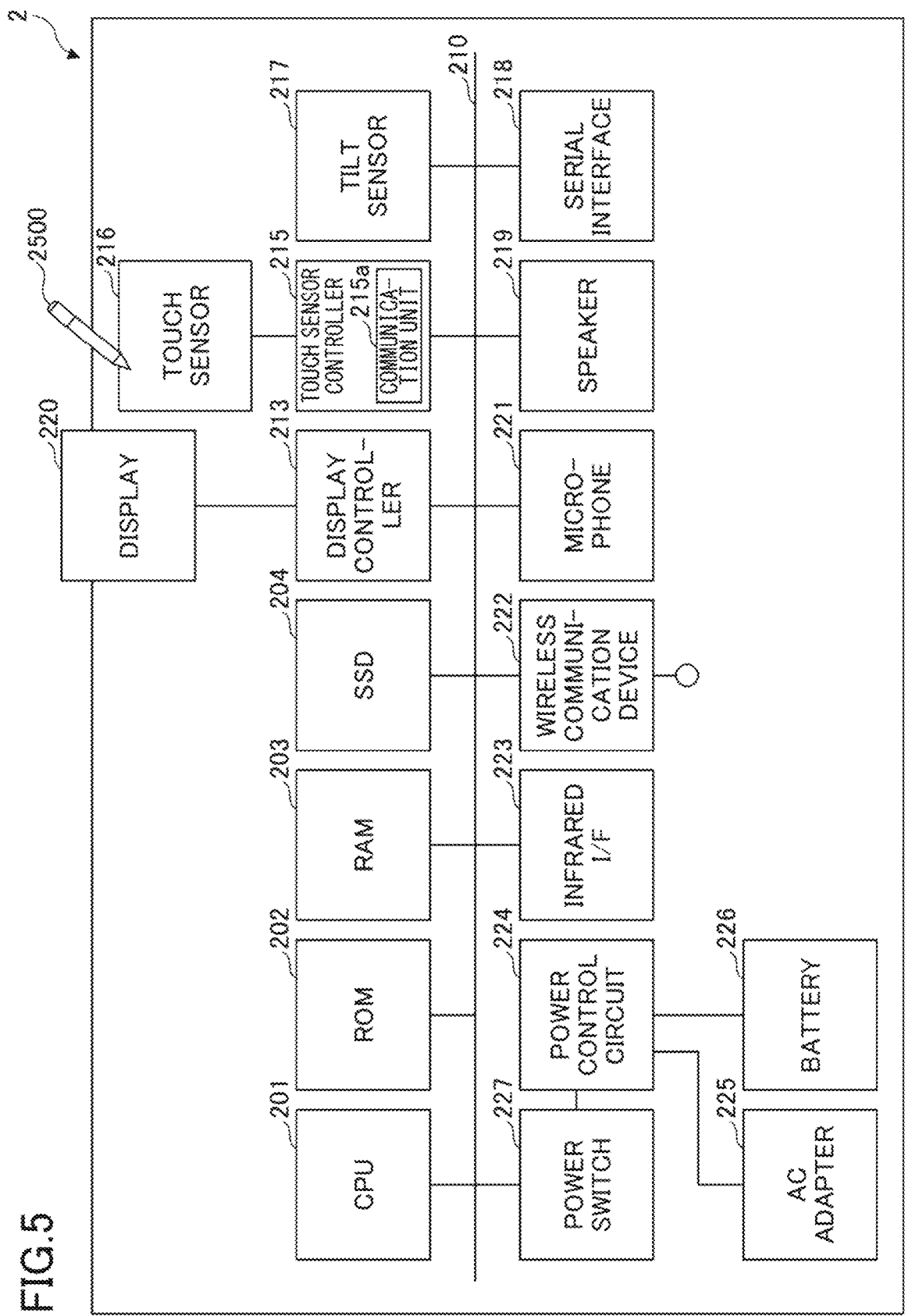
FIG. 5 is an example of a hardware configuration diagram of a display apparatus.

Next, a hardware configuration of the display apparatus 2 will be described with reference to FIG. 5. The display apparatus 2 has a configuration of an information processing apparatus or computer as illustrated. FIG. 5 is an example of a hardware configuration diagram of the display apparatus 2. As illustrated in FIG. 5, the display apparatus 2 includes a central processing unit (CPU) 201, a read-only memory (ROM) 202, a random access memory (RAM) 203, and a solid state drive (SSD) 204.

Among these, the CPU 201 controls operations of the entire display apparatus 2. The ROM 202 stores programs used by the CPU 201, or used for driving the CPU 201, such as an initial program loader (IPL). The RAM 203 is used as a work area of the CPU 201. The SSD 204 stores various items of data of and OS, programs, and the like for the display apparatus 2. Note that these program may be application programs that can run on an information processing apparatus installing a general-purpose operating system (Windows (registered trademark), Mac OS (registered trademark), Android (registered trademark), iOS (registered trademark), etc.).

Also, the display apparatus 2 includes a display controller 213, a touch sensor controller 215, a touch sensor 216, a display 220, a power switch 227, a tilt sensor 217, a serial interface 218, a speaker 219, a microphone 221, a wireless communication device 222, an infrared I/F 223, a power supply control circuit 224, an AC adapter 225, and a battery 226.

The display controller 213 controls and manages displaying on the screen for outputting output images to the display 220 or the like. The touch sensor 216 detects that a contact by the pen 2500, a hand of the user, or the like (the pen and the hand of the user serving as the input unit) on the display 220. Also, the touch sensor 216 receives a pen ID.

The touch sensor controller 215 controls a process executed by the touch sensor 216. The touch sensor 216 receives input of coordinates and detects coordinates. This method of inputting coordinates and detecting coordinates is, for example, in the case of an optical scheme, a method in which two light receiving/emitting devices arranged at both ends on the upper side of the display 220, emit multiple infrared rays parallel to the display 220; and receiving elements receive light that is reflected by a reflecting member arranged around the display 220, and comes back through the same light path as the emitted light. The touch sensor 216 outputs positional information on the infrared rays that have been emitted by the two light receiving/emitting devices, and cut off by an object, to the touch sensor controller 215, and the touch sensor controller 215 identifies a coordinate position as the contact position of the object. Also, the touch sensor controller 215 has a communication unit 215a, to be capable of communicating wirelessly with the pen 2500. For example, a commercial pen can be used in the case where the communication is based on standards such as Bluetooth (registered trademark). If one or more pens 2500 are registered in advance in the communication unit 215a, the user can perform communication without executing connection settings to cause the pen 2500 to communicate with the display apparatus 2.

The power switch 227 is a switch for switching on and off the power of the display apparatus 2. The tilt sensor 217 is a sensor to detect the tilt angle of the display apparatus 2. The tilt sensor 217 is primarily used for detecting whether the display apparatus 2 is being placed upright (longer than it is wide, or wider than it is long) or flat, so that the thickness of characters and the like can be automatically changed depending on the placement form.

The serial interface 218 is a communication interface with the outside, such as the USB, and used for inputting information from the outside. The speaker 219 is used for outputting sound, and the microphone 221 is used for inputting sound. The wireless communication device 222 communicates with a terminal carried by the user, for example, to relay a connection to the Internet. Although the wireless communication device 222 communicates via Wi-Fi, Bluetooth (registered trademark), or the like, any communication standards can be used. The wireless communication device 222 forms an access point, and once the user sets an obtained service set identifier (SSID) and an obtained password to the terminal carried by the user, the user can establish a connection to the access point.

Note that preferably, two access points are provided in the wireless communication device 222:
(a) an access point to the Internet; and
(b) an access point to an inhouse network, and to the Internet.
The access point (a) is provided for users outside a company, and the users cannot access the inhouse network, but can use the Internet. The access point (b) is provided for users inside the company, and the users can use the inhouse network as well as the Internet.

The infrared I/F 223 detects a display apparatus 2 arranged adjacently, and can detect only the display apparatus 2 arranged adjacently by using the straightness of infrared rays. It is favorable to provide one infrared I/F 223 on each side, so as to be capable of detecting in which directions the other display apparatuses 2 are arranged. Arranging multiple display apparatuses 2 broadens the screen, and handwritten information or the like written by hand in the past (e.g., handwritten information on another page where the page size is assumed to be equivalent to the area of one display 220) can be displayed across the neighboring display apparatuses 2.

The power supply control circuit 224 controls the AC adapter 225 and the battery 226 as the power supplies of the display apparatus 2. The AC adapter 225 converts AC power supplied by the commercial power supply into DC power.

In the case of the display 220 being what-is-called an electronic paper, the display 220 consumes little or no power to maintain the display of images, and hence, can also be driven by the battery 226. In this way, the display apparatus 2 can be used even in an outdoor location where it is difficult to be connected with a power supply, for an application such as digital signage.

Further, the display apparatus 2 is provided with a bus line 210. The bus line 210 is constituted with an address bus, a data bus, and the like for electrically connecting the components illustrated in FIG. 5 including the CPU 201 and the like.

Note that the touch sensor 216 is not limited to being an optical type, and various types of detection units can be used, including a touch panel of an electrostatic capacitance scheme that identifies a contact position by detecting a change in electrostatic capacitance; a touch panel of a resistance film scheme that identifies a contact position by a voltage change in two resistor films facing each other; and a touch panel of an electromagnetic induction scheme that identifies a contact position by detecting electromagnetic induction generated by a contact object contacting a display unit. The touch sensor 216 may adopt a scheme that does not require the input unit being an electronic pen when detecting whether a touch is performed with the tip. In this case, a fingertip or a pen-shaped bar can be used for a touch operation. Note that the pen 2500 does not need to have an elongated pen shape.

<Functional Units of Device>

Figure 6A:
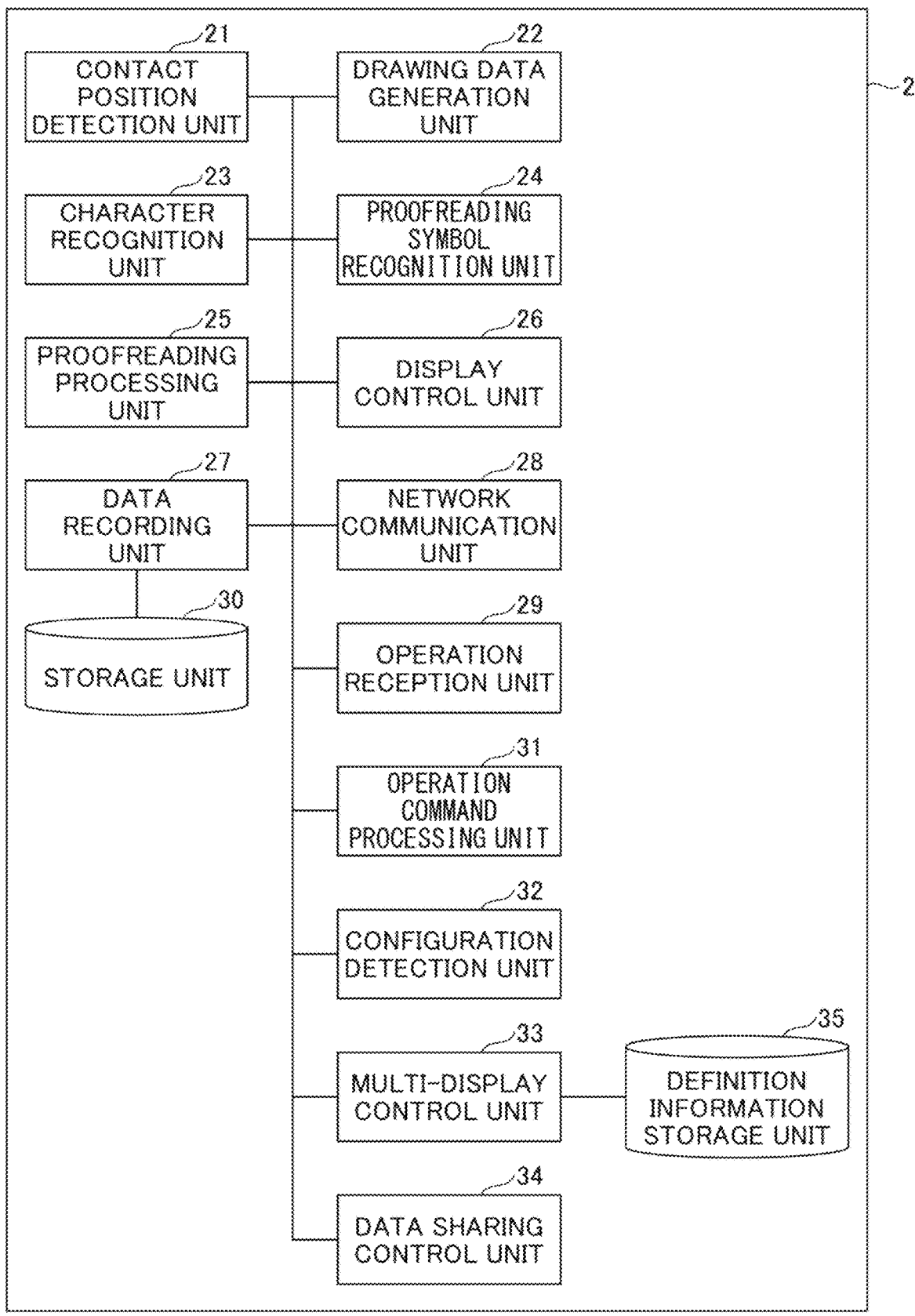
FIG. 6A is an example of a functional block diagram illustrating functional units of a display apparatus in separate blocks.

Next, functional units of the display apparatus 2 will be described with reference to FIG. 6A. FIG. 6A is an example of a functional block diagram illustrating functional units of the display apparatus 2 in separate blocks. The display apparatus 2 includes a contact position detection unit 21, a drawing data generation unit 22, a character recognition unit 23, a proofreading symbol recognition unit 24, a proofreading processing unit 25, a display control unit 26, a data recording unit 27, a network communication unit 28, an operation reception unit 29, an operation command processing unit 31, a configuration detection unit 32, a multi-display control unit 33, and a data sharing control unit 34. The functional units of the display apparatus 2 provide functions or measures implemented by one or more components illustrated in FIG. 5 operating according to instructions from the CPU 201 executing a program loaded on the RAM 203 from the SSD 204.

The contact position detection unit 21 detects coordinates of a position at which the pen 2500 contacts the touch sensor 216. The drawing data generation unit 22 obtains the coordinates of the pen tip of the pen 2500 from the contact position detection unit 21, and by interpolating a sequence of coordinate points, generates stroke data. The contact position detection unit 21 is implemented by the touch sensor controller 215 and the touch sensor 216.

The character recognition unit 23 applies character recognition processing to one or more items of stroke data (handwritten data) written by hand by the user, and converts the data items into character codes. The character recognition unit 23 recognizes a character (not only in Japanese language but also in many language including English), a number, a symbol (%, $, &, etc.), a figure (line, circle, triangle, etc.) in parallel with processing pen operations of the user. Although various algorithms have been devised as recognition methods, the details are omitted in the present embodiment, as publicly known techniques are readily available. The character recognition unit 23 is implemented by the CPU 201 executing a program.

The proofreading symbol recognition unit 24 detects a proofreading symbol from handwritten data of the user. From the viewpoint of the computer, a proofreading symbol has a shape of stroke similar to those of characters and the like; therefore, for example, if the developer gives coordinates of a proofreading symbol as training data of machine learning, the proofreading symbol can be detected in substantially the same way as with characters. The proofreading symbol recognition unit 24 is implemented by the CPU 201 executing a program.

Based on the detected proofreading symbols, the proofreading processing unit 25 determines the contents of proof correction such as replacement, exchange, or insertion of characters, and arranges one or more characters (that may be recognized after handwriting or may be present originally in the string) at a position of a string designated by the proofreading symbol. The proofreading processing unit 25 is implemented by the CPU 201 executing a program.

The display control unit 26 displays handwritten data, a string converted from the handwritten data, operation commands, an operation menu for the user to perform operations, and the like on the display. The display control unit 26 is implemented by the display controller 213 and the display 220.

The data recording unit 27 stores handwritten data written by hand on the display apparatus 2, a screen transmitted from a PC, a file, and the like in the storage unit 30. The data recording unit 27 is implemented by the CPU 201 executing a program.

The network communication unit 28 establishes a connection to a network such as a LAN, to transmit and receive data via the network with other devices (including the other display apparatuses). The network communication unit 28 is implemented by the wireless communication device 222.

The operation command processing unit 31 searches for a defined keyword that matches a recognized character in operation command definition data that will be described later. The operation command processing unit 31 searches in the operation command definition data including operation commands related to the multi-displaying function only in the case where another display apparatus 2 is detected. The operation commands related to the multi-displaying function are operation commands that display data using multiple display apparatuses 2, and correspond to operation commands enabling and changing the operation mode that will be described later. The operation commands are displayed by the display control unit 26 together with candidate strings as a result of character recognition. The operation command processing unit 31 is implemented by the CPU 201 executing a program.

The configuration detection unit 32 detects other display apparatuses 2 connected with the display apparatus. Up to four display apparatuses 2 can be connected with the display apparatus. Connection means that communication becomes available via short-range wireless communication by using the infrared I/F 223 or the like, and does not need to be physically connected or fixed (although may be physically connected). The configuration detection unit 32 transmits the connection state of the display apparatus to the other display apparatuses 2. The configuration detection unit 32 determines whether the display apparatus is a master display or a sub-display, based on the connection state. The master display is a display apparatus 2 that controls the multi-displaying function. The sub-display is a display apparatus 2 other than the master display. The master display is dynamically determined according to the arrangement of the other display apparatuses 2 detected by the infrared I/F 223 (e.g., a display apparatus 2 at the origin). Alternatively, a display apparatus 2 configured to be set as the master display may serve as the master display. Also, preinstalled unique IDs may be exchanged via the infrared I/F 223, to determine a display apparatus 2 having a greatest or smallest ID value as the master display.

The master display mainly executes
generation of arrangement information;
transmission of pages to be displayed on the other display apparatuses 2 and display ranges;
transmission of all items of handwritten data so that the handwritten data can be shared with a display apparatus 2 recovered from communication failure, and a newly connected display apparatus 2; and the like.

In the case of being included in the master display, the configuration detection unit 32 detects the arrangement of the multiple display apparatuses 2 based on the respective connection states from the other display apparatuses 2. The configuration detection unit 32 is implemented by, for example, the infrared I/F 223.

The multi-display control unit 33 is a functional unit that is enabled on a display apparatus 2 serving as the master display. In the case of receiving a message that an operation command related to the multi-displaying has been selected from the operation reception unit 29 (in the case of receiving a message that the master display has been operated); or in the case of receiving a message that an operation command related to the multi-displaying has been selected from another display apparatus 2, the multi-display control unit 33 executes controlling related to the multi-displaying.

For this control, the definition information storage unit 35 defines a page number and a display range to be displayed on each of the display apparatuses 2 in each operation mode. The multi-display control unit 33 obtains these items of definition information from the definition information storage unit 35, determines a page and a display range to be displayed on each of the multiple display apparatuses 2 based on the definition information, and transmits the page number and the display range to each of the other display apparatuses 2. The multi-display control unit 33 is implemented by, for example, the CPU 201 executing a program.

The data sharing control unit 34 shares data (handwritten data, PC screens, files, and the like) to be displayed on the respective display apparatuses 2 with all the other display apparatuses 2, and transmits the date for sharing regardless of whether it is the master display or a sub-display. The data sharing control unit 34 is implemented by, for example, the wireless communication device 222.

The storage unit 30 is built in the SSD 204, the RAM 203, or the like illustrated in FIG. 5, and stores the information described above recorded by the data recording unit 27.

The storage unit 30 stores data items as illustrated in FIGS. 6B to 6D. FIG. 6B schematically illustrates page data. The page data is one page of handwritten data displayed on the display.

In the page data, as illustrated in FIG. 6B, records of data are stored, wherein each record includes associated data fields of a page data ID identifying one page; a start time representing a time when displaying of this page started; an end time representing a time when rewriting of the contents of this page ended; stroke array data ID for identifying stroke array data generated with strokes performed with the pen 2500 or a hand or finger of the user; and media data ID for identifying media data such as image data.

Based on such fields of page data, for example, in the case where the user writes a character of "S" in the English alphabet with the pen 2500, the character is written with one stroke; therefore, the single character of "S" in the English alphabet is represented with one stroke data ID. In the case where the user writes a character of "T" in the English alphabet with the pen 2500, the character is written with two strokes; therefore, a single character of "T" in the English alphabet is represented with two stroke data IDs.

Also, the stroke array data represents detailed information as illustrated in FIG. 6C. FIG. 6C illustrates the stroke array data. The stroke array data is represented with multiple records of stroke data. Further, one record of the stroke data includes associated data fields of a data ID; a stroke data ID for identifying this stroke data; a start time representing a time when writing of this record of stroke data started (pen down); an end time representing a time when writing of this record of stroke data ended (pen up); a color of this record of stroke data; a width of this record of stroke data; and coordinate array data ID for identifying an array of passing points of this record of stroke data.

FIG. 6D illustrates coordinate array data. As illustrated in FIG. 6D, a record of the coordinate array data represents information on a point on a display (X coordinate value and Y coordinate value); a time difference (ms) between the start time of the corresponding record of stroke data and a time when the stroke has passed this point; and pen pressure of the pen 2500 at this point. In other words, a collection of points (records) illustrated in FIG. 6D is indicated by one field of coordinate array data ID illustrated in FIG. 6C. For example, in the case where the user draws a character of "S" in the English alphabet with the pen 2500, the character is written with one stroke, and the stoke passes through multiple passing points before completing "S"; therefore, the coordinate array data indicates information on these multiple passing points.

Note that although FIGS. 6B to 6D illustrate an example of stroke data to which character recognition is not yet applied, in the case where character recognition has been applied, by units of applications of character recognition, for one or more strings, character codes, font, color, positional information (the upper left corner of a circumscribed rectangle, the lower right corner of the circumscribed rectangle), start time, and end time are registered.

<Definition Information Stored in Definition Information Storage Unit>

FIGS. 7A to 7G illustrate examples of definition information stored in the definition information storage unit 35. With FIGS. 7A to 7G, cases where four display apparatuses 2A to 2D (or displays) are connected will be described.

Figure 8:
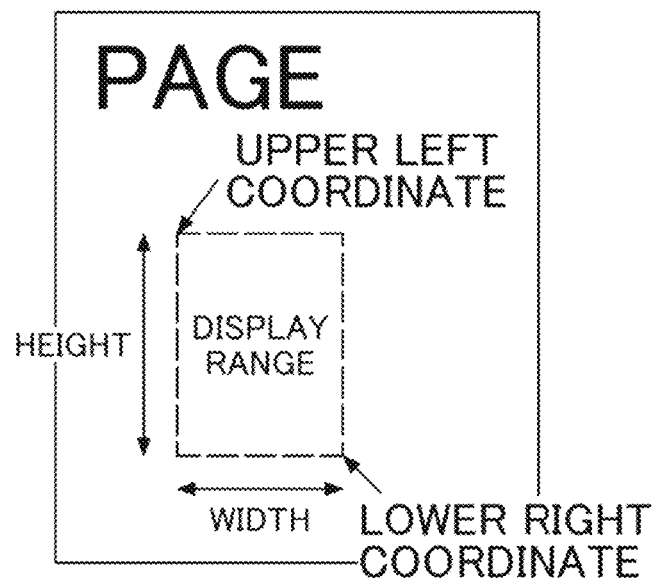
FIG. 8 is a diagram illustrating a correspondence between a page and a display range.

FIG. 7A is an example of definition information 601 in the case where the operation mode is Cloning. Cloning is an operation command to display the same page. FIG. 7B illustrates an example of displays on the respective display apparatuses 2 in the case of Cloning. In the case of Cloning, the "page number" is the same for all the display apparatuses 2. Also, the "display range" is the same for all the display apparatuses 2. As illustrated in FIG. 8, the display range corresponds to the position of a page on a display. FIG. 8 is a diagram illustrating a correspondence between a page and a display range. In FIG. 8, the display range is smaller than the page. As illustrated in FIG. 8, the display range is specified by one of the following sets of values:

coordinates in the upper left corner, and coordinates in the lower right corner;

coordinates in the upper left corner, width, and height; and coordinates in the upper left corner, the enlargement factor with respect to the original page.

In the case where the operation mode is Cloning, the same display range as a display range set by the user on the master display (in the figure, the display apparatus 2A) is reflected in the other display apparatuses 2B to 2D. Display ranges set by the user on the display apparatuses 2B to 2D are also reflected on the master display.

FIG. 7C is an example of definition information 602 in the case where the operation mode is Multi-paging. Multi-paging is an operation command to cause each display to display any page. FIG. 7D illustrates an example of displays on the respective display apparatuses 2 in the case of Multi-paging. In the definition information 602 for the Multi-paging, the "page number" is set to be incremental for a sequence of the display apparatuses 2. In the case where the master display displays P1 (page 1), the sub-displays are set with page numbers that are incremental one by one, such as P2, P3, and P4, with reference to P1. Also, the display apparatuses 2A to 2D display different pages; therefore, the display range can be set discretionarily for each page (can be set individually by the user).

FIG. 7E illustrates definition information 603 in the case where the operation mode is Tiling. Tiling is an operation command to display one page on multiple displays. FIG. 7F illustrates an example of displays on the respective display apparatuses 2 in the case of Tiling. In the case of Tiling, the "page number" is the same for all the display apparatuses 2. This page number corresponds to a page specified by the user for displaying. Also, in the case where one page is displayed over the entirety of the display apparatuses 2, the "display range" corresponds information representing a region of the one page displayed on each of the display apparatuses 2. Also in this case, the display range is specified by one of the following sets of values:

coordinates in the upper left corner, and coordinates in the lower right corner;

coordinates in the upper left corner, width, and height; and coordinates in the upper left corner, the enlargement factor with respect to the original page. To be brief, these are four regions in the case where the original page is cut into quarters. The upper left, upper right, lower left, and lower right in the definition information 603 mean the respective regions in the one page. Details will be described with reference to FIG. 9.

FIG. 7G is an example of a display where the user enlarged the page. Due to the enlargement, one page is larger than the coverage of the entirety of the four display apparatuses 2. In this case, the display range of each of the display apparatuses 2 is determined depending on which part of the page is specified by the user for displaying.

Based on the definition information stored in the definition information storage unit 35, the multi-display control unit 33 transmits pages and display ranges to be displayed on the other display apparatuses 2. In this way, even in different operation modes, the same definition information can be used for defining the operation modes, and the multi-display control unit 33 can execute switching between the operation modes easily.

Figure 9:
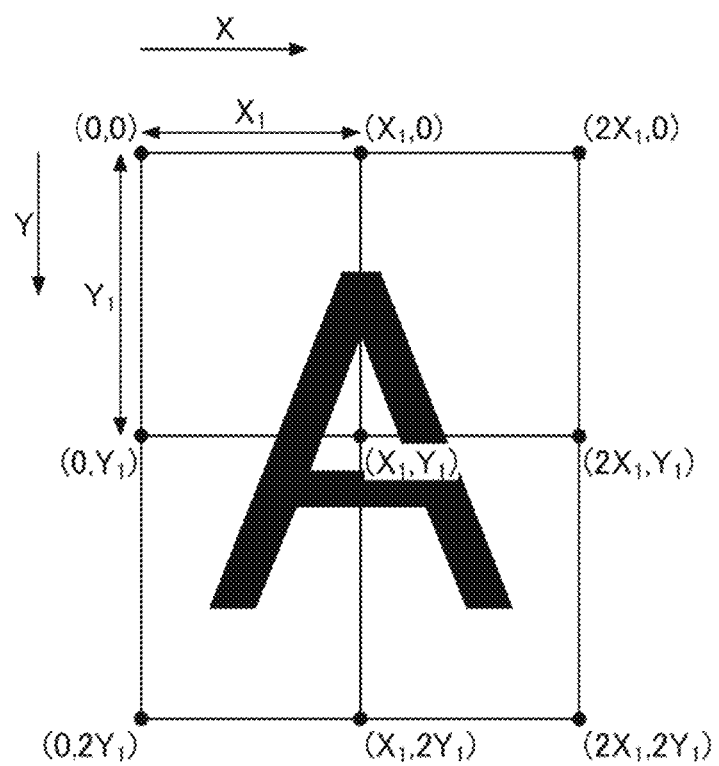
FIG. 9 is a diagram illustrating a display range in the case of Tiling.

With reference to FIG. 9, the display range in the case of Tiling will be further noted. FIG. 9 is a diagram illustrating coordinates of a display range in the case of Tiling. In the case of Tiling, multiple display apparatuses 2 display one page; therefore, each of the display apparatuses 2 displays a part of the page. In the present embodiment, with setting the upper left corner of the master display as the origin, the multi-display control unit 33 calculates the display ranges in the one page to be displayed on the respective display apparatuses 2.

First, denote the width of one display apparatus 2 as $X_1$ and the height as $Y_1$ in units of pixels. Also, for the sake of simplifying the description, suppose that image data is displayed over the entirety of the four display apparatuses 2. The coordinates of the vertices of each of the display apparatuses 2 and the coordinates of the image data corresponding to the vertices are determined as illustrated in FIG. 9. Therefore, the multi-display control unit 33 can determine the display range of the display apparatus 2A, and indicate the display ranges to the other display apparatuses 2B to 2D as follows:

display apparatus 2A: 0 to $X_1$, 0 to $Y_1$;

display apparatus 2B: $X_1$ to $2X_1$, 0 to $Y_1$;

display apparatus 2C: 0 to $X_1$, $Y_1$ to $2Y_1$; and display apparatus 2D: $X_1$ to $2X_1$, $Y_1$ to $2Y_1$.

Note that as illustrated in FIG. 7G, the display apparatus 2 can enlarge or reduce an image, and depending on the enlargement factor or the reduction factor, the region that can be contained within the display range varies; therefore, the four display apparatuses 2 share the enlargement factor or the reduction factor. In the case of enlarging or reducing an image, the display range of the display apparatus 2A is determined depending on the enlargement factor, the reduction factor, or the user operation. By setting the display range of the display apparatus 2A as the reference, the multi-display control unit 33 sets a display range obtained by shifting that of the display apparatus 2A to the right side, as the display range of the display apparatus 2B. Also, the multi-display control unit 33 sets a display range obtained by shifting to the lower side, as the display range of the display apparatus 2C. Also, the multi-display control unit 33 sets a display range obtained by shifting to the lower right side, as the display range of the display apparatus 2D. The display apparatuses 2B to 2D display the indicated display ranges by the shared enlargement or reduction factor.

<Detection of Connection State>

Figure 10:
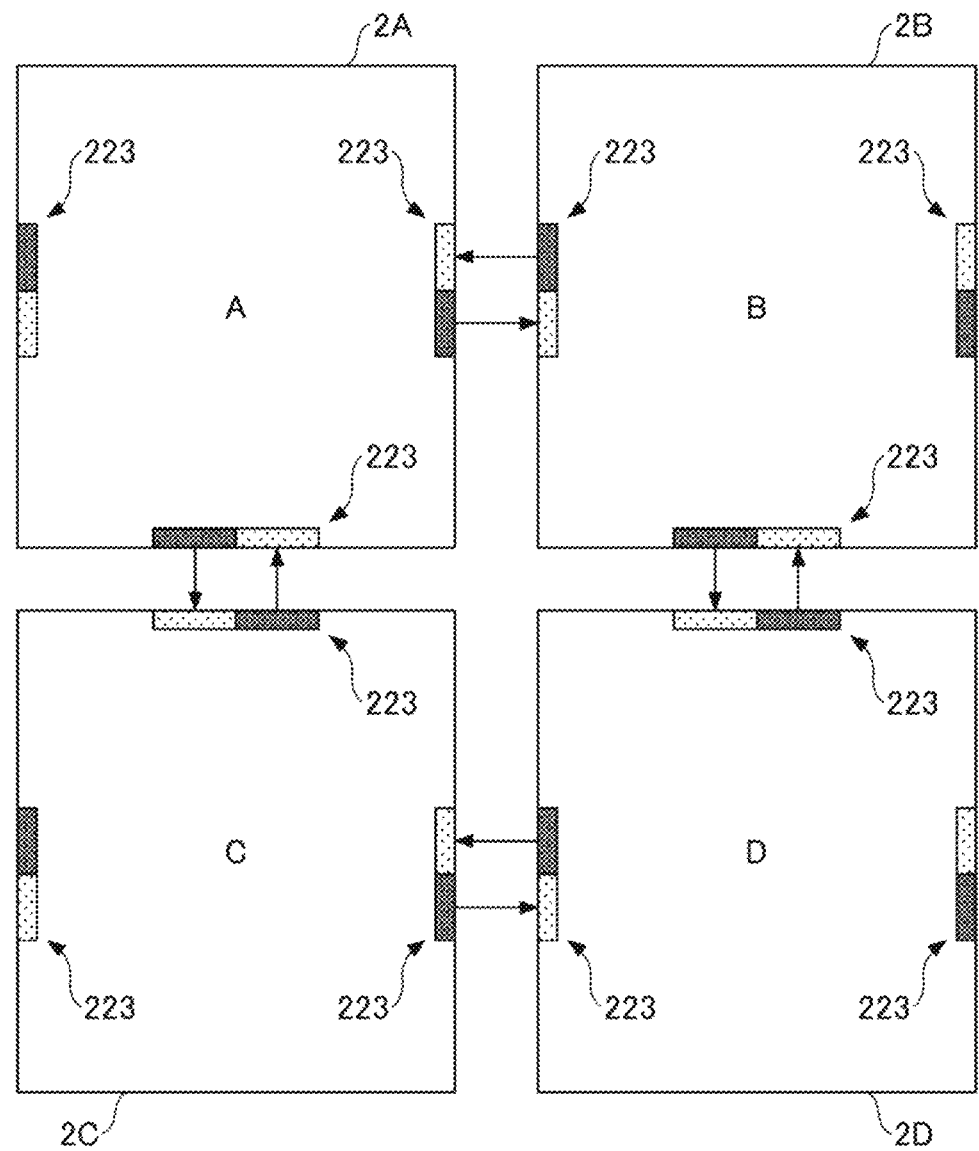
FIG. 10 is a diagram illustrating an example of a state in which multiple display apparatuses are arranged.

FIG. 10 is a diagram illustrating an example of a state in which multiple display apparatuses 2 are arranged. Each of the display apparatuses 2 has the infrared I/F 223 on one or more sides, to detect the other display apparatuses 2 on the one or more sides. In the example in FIG. 10, the display apparatus 2A has the display apparatus 2B arranged on the right side, the display apparatus 2C arranged on the lower side, and the display apparatus 2D arranged on the obliquely lower side, to be adjacent to one another. As such, in the case where the multiple display apparatuses 2 are arranged in a tiling fashion having corresponding sides parallel to one another, the infrared I/F 223 provided on the sides are opposite to each other.

Figure 11:
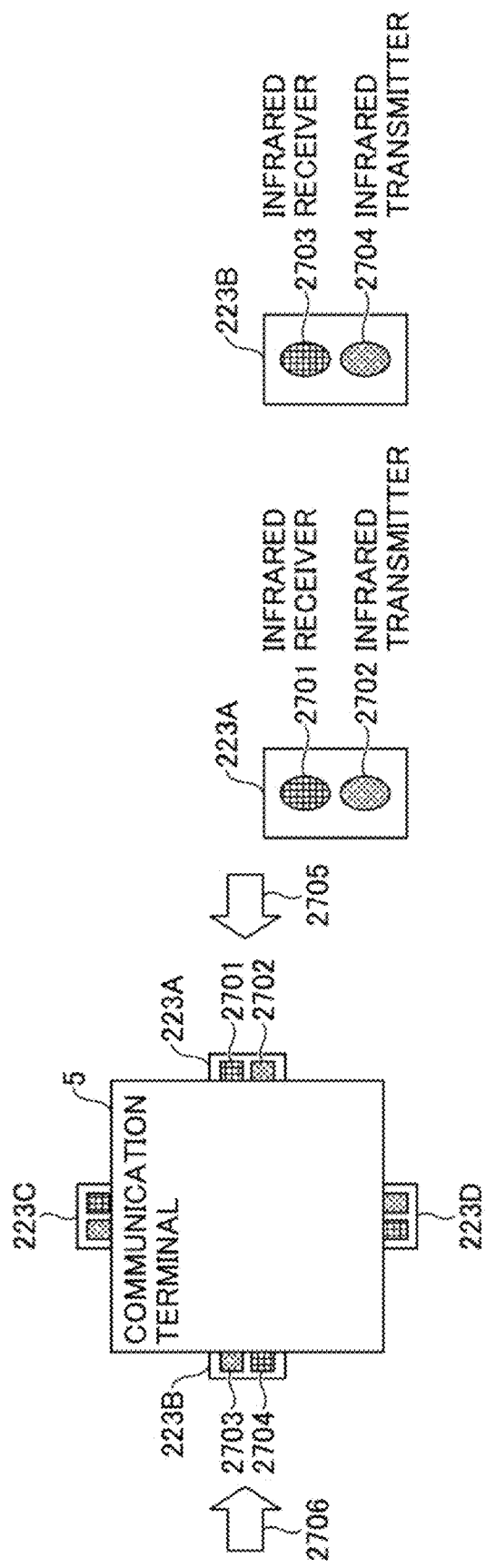
FIGS. 11A to 11C are diagrams illustrating an example of a configuration of infrared interfaces (I/F)

FIGS. 11A to 11C are diagrams illustrating an example of a configuration of the infrared I/F 223. In FIG. 11A, on a side on the right and on a side on the left of the display apparatus 2, the infrared I/F 223 having an infrared receiver and an infrared transmitter integrated, are provided at substantially the same height. Infrared receivers 2701 and 2704 include, for example, photo-sensing elements such as photo-diodes, photo-transistors, or photo-ICs (Integrated Circuits). Also, infrared transmitters 2702 and 2703 include, for example, light emitting devices such as light emitting diodes.

As the infrared receiver and the infrared transmitter, for example, hardware components, communication modules, and the like compliant with IrDA (Infrared Data Association) standard can be suitably used. Also, use of infrared rays is merely an example, and for example, light including visible light, ultraviolet rays, or the like may be used.

FIG. 11B is a diagram of a sensor part 223A as viewed in a direction of an arrow 2705 in FIG. 11A. In the sensor part 223A, the infrared receiver 2701 is arranged on the upper side, and the infrared transmitter 2702 is arranged on the lower side. The infrared transmitter 2702 transmits identification information of the display apparatus 2, for example, the terminal ID or the like.

FIG. 11C is a diagram of a sensor part 223B as viewed in a direction of an arrow 2706 in FIG. 11A. In the sensor part 223B, the infrared transmitter 2703 is arranged on the upper side, and the infrared receiver 2704 is arranged on the lower side. The infrared transmitter 2703 transmits identification information of the display apparatus 2, for example, the terminal ID or the like.

As such, in the sensor part 223A and the sensor part 223B, the infrared transmitter and the infrared receiver are arranged to be rotationally symmetric. In this way, for example, in the case where another display apparatus 2 is adjacently arranged on the right side or the left side of the display apparatus 2, at an aligned position in the up-and-down direction, the sensor part 223A and the sensor part 223B are configured to have the infrared receiver of the display apparatus 2 positioned opposite to the infrared transmitter of the other adjacently arranged display apparatus 2.

Similarly, as illustrated in FIG. 11A, the sensor part 223C and the sensor part 223D are arranged at the same position in the left-and-right direction on the upper side and on the lower side, respectively, of the display apparatus 2. Further, in the sensor part 223C and the sensor part 223D, the infrared transmitter and the infrared receiver are arranged symmetrically. In this way, for example, in the case where another display apparatus 2 is adjacently arranged on the upper side or the lower side of the display apparatus 2, at an aligned position in the left-and-right direction, the sensor part 223C and the sensor part 223D are configured to have the infrared receiver of the display apparatus 2 positioned opposite to the infrared transmitter of the other adjacently arranged display apparatus 2.

According to the configuration described above, in the case where the distance between the display apparatus 2 and the other adjacently arranged display apparatus 2 is a distance that allows infrared rays to be received by the respective receivers, infrared communication is established and the terminal IDs are exchanged. Note that the distance within which the display apparatus 2 can communicate with the other display apparatus 2 is designed appropriately. A smaller receivable distance makes the distance between the display apparatuses shorter, and hence, results in higher visibility of data to be displayed, whereas a longer receivable distance makes it easier to detect another adjacently arranged display apparatus 2 (makes disconnection of the communication less likely to happen), and hence, results in greater usability.

In this way, the display apparatus 2 can obtain the presence or absence of each of the other display apparatuses 2 adjacently arranged at a predetermined position, and if present, further obtain the position (in terms of up, down, left, or right), and the identification information (terminal ID).

Note that the sensor part in which the infrared receiver is integrated with the infrared transmitter is merely an example; the infrared receiver may be provided separately from the infrared transmitter.

Figure 12:
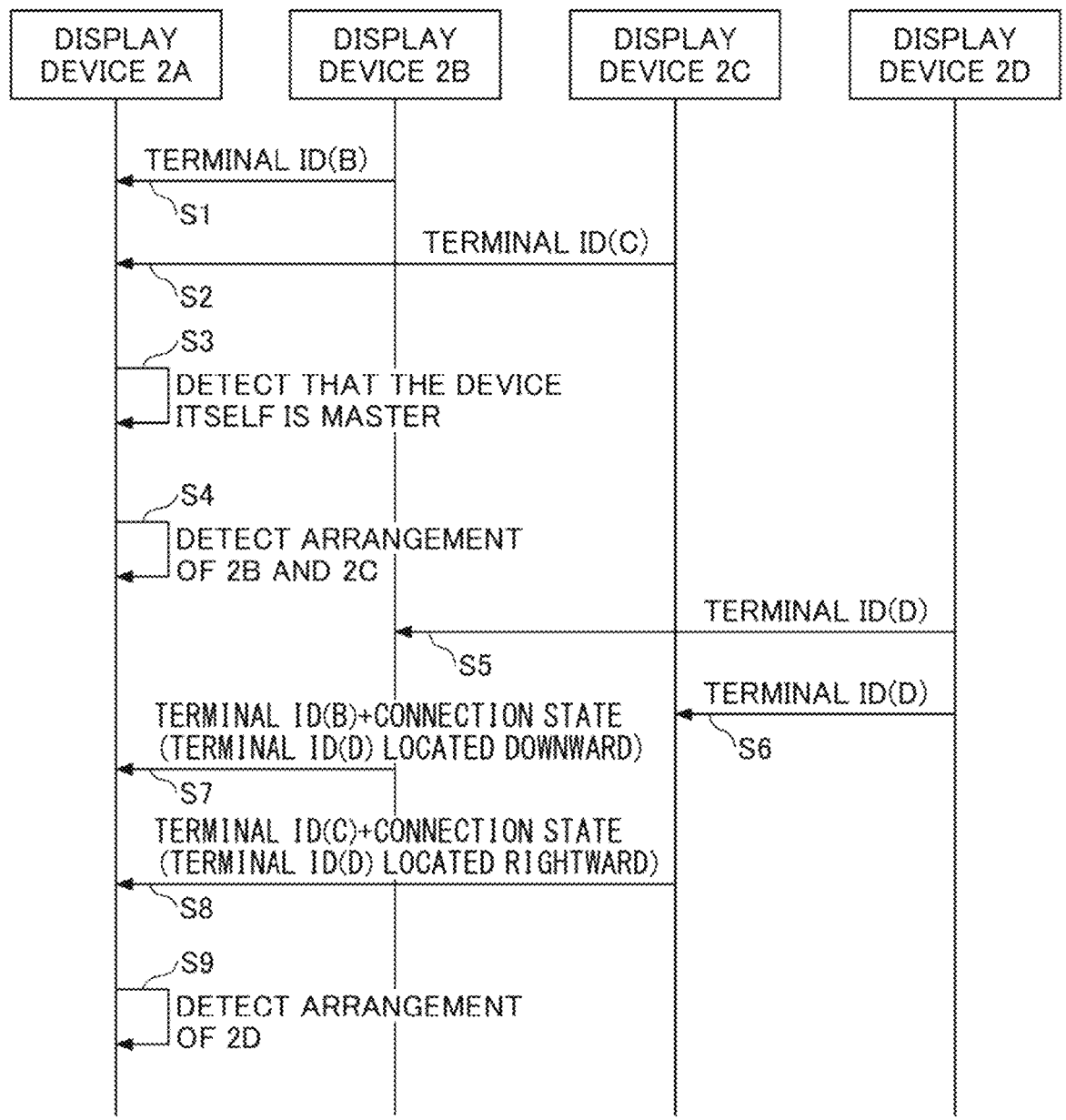
FIG. 12 is an example of a sequence chart illustrating steps executed by a configuration detection unit to detect arrangement information on the multiple display apparatuses.

FIG. 12 is an example of a sequence chart illustrating steps executed by the configuration detection unit 32 to detect an arrangement of multiple display apparatuses 2. The processing in FIG. 12 is executed, for example, periodically. For the sake of description, it is assumed that the terminal ID of the display apparatus 2A is A, the terminal ID of the display apparatus 2B is B, the terminal ID of the display apparatus 2C is C, and the terminal ID of the display apparatus 2D is D.

S1 and S2: in the case where the distance between the infrared I/F 223 provided on the opposite sides of the display apparatuses 2 is less than a threshold value (or less than or equal to a threshold value), and communication can be executed, each of the display apparatuses 2 transmits its own terminal ID via the infrared interface. In this way, the configuration detection unit 32 of the display apparatus 2A (an example of a primary display apparatus) receives the terminal ID=B of the display apparatus 2B (an example of a secondary display apparatus) from the infrared I/F 223 on the right side, and receives the terminal ID=C of the display apparatus 2C (an example of a secondary display apparatus) from the infrared I/F 223 on the lower side.

Note that in the case where the receiver receives infrared rays having an intensity greater than or equal to a reference value (value converted from the received intensity of the infrared rays to a voltage value), the corresponding display apparatus 2 determines that another display apparatus 2 is detected. Therefore, it is not the case that the display apparatus 2 compares the distance with a threshold value. However, in the case where the receiver of the display apparatus 2 receives infrared rays greater than or equal to the reference value, the distance may be less than a threshold value (or less than or equal to a threshold value); therefore, in the following, for the sake of convenience of the description, the wording of "the distance less than a threshold value (or less than or equal to a threshold value)" may be used.

S3: based on no communication being executed via the infrared I/F 223 on the left side and on the upper side with other display apparatuses 2, the configuration detection unit 32 determines that the display apparatus is a master display. As such, in the present embodiment, the most upper left display apparatus 2 is determined as the master display. This is simply because the origin of coordinates is set to the upper left; alternatively, the display apparatus 2 in the upper right, lower right, or lower left may serve as the master display.

Figure 13:
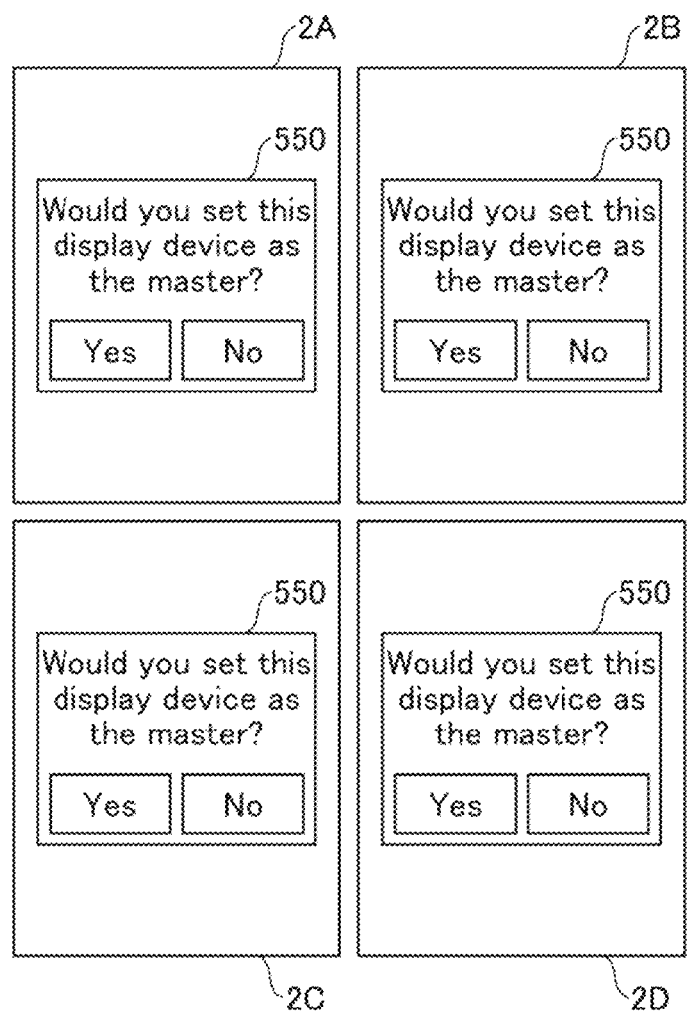
FIG. 13 is a diagram illustrating an example of a dialog box displayed on each display apparatus.

Also, as illustrated in FIG. 13, instead of having each of the display apparatuses 2 determine whether the display apparatuses 2 is the master display based on the communication states of the infrared I/F 223 on the respective sides, each of the display apparatuses 2 that detects another display apparatus 2 may display a dialog box to receive a command from the user indicating whether the display apparatus 2 is the master display. FIG. 13 is a diagram illustrating an example of a dialog box 550 displayed on each of the display apparatuses 2. Each of the display apparatuses 2 displays a dialog box 550 when detecting another display apparatus 2. The dialog box 550 displays, for example, "Set this display apparatus 2 as the master? YES/NO". The display apparatus 2 that has received "YES" transmits, from each of the infrared I/F 223, notice of its terminal ID together with its setting as the master display.

S4: the processing will be described, referring back to FIG. 12. Also, as having received the terminal ID=B from the infrared I/F 223 on the right side, the configuration detection unit 32 of the upper-left display apparatus 2A determines that the display apparatus 2B being arranged on the right side is detected. As having received the terminal ID=C from the infrared I/F 223 on the lower side, the configuration detection unit 32 determines that the display apparatus 2C being arranged on the lower side is detected.

S5 and S6: meanwhile, the configuration detection unit 32 of the display apparatus 2D also communicates with the display apparatuses 2B and 2C. The configuration detection unit 32 of the display apparatus 2B receives the terminal ID=D from the infrared I/F 223 on the lower side. The configuration detection unit 32 of the display apparatus 2C receives the terminal ID=D from the infrared I/F 223 on the right side.

S7: the configuration detection unit 32 of the display apparatus 2A receives from the infrared I/F 223 on the right side, the terminal ID=B, and notice of the display apparatus 2D having the terminal ID=D being connected to the lower side of the display apparatus 2B.

S8: the configuration detection unit 32 of the display apparatus 2A receives from the infrared I/F 223 on the lower side, the terminal ID=C, and notice of the display apparatus 2D having the terminal ID=D being connected to the right side of the display apparatus 2C.

S9: the configuration detection unit 32 of the display apparatus 2A detects that the display apparatus 2D is arranged on the lower side of the display apparatus 2B and on the right side of the display apparatus 2C.

As such, the master display detects the arrangement of the multiple display apparatuses 2, based on information on the display apparatuses 2B and 2C, and on the display apparatus 2D detected by the display apparatuses 2B and 2C and received from the display apparatuses 2B and 2C (in the case where another display apparatus 2 is further connected to the display apparatus 2D, the other display apparatus connected to the display apparatus). In other words, the configuration detection unit 32 of the master display detects other display apparatuses 2 whose sides are located at a distance less than a threshold value or less than or equal to a threshold value from the corresponding sides of the display apparatuses 2B and 2C. By having each of the display apparatuses 2 transmit its connection state to the other display apparatuses 2, the master display can detect the arrangement of the multiple display apparatuses 2.

FIG. 14 is a diagram illustrating an example of arrangement information generated by the configuration detection unit 32 in this way. In the arrangement information, each record includes fields of arranged position and an IP address associated with a terminal ID. The arranged position is represented as an element of a matrix having an origin corresponding to the location of the upper-left master display. Also, the IP address is transmitted from each of the display apparatuses 2 to the master display together with a connection state. The IP address is used in the case where the display apparatus 2 communicates via the network. Note that it is favorable that the arrangement information is shared by all of the display apparatuses 2. This is because the display apparatus 2 being a sub-display may transmit handwritten data or the like to the master display as the destination.

In the case where any one of the display apparatuses 2 communicates with any other display apparatuses 2 via the infrared I/F 223, a non-duplicate message ID is assigned, and together with the terminal ID of the transmitting device and the terminal ID of the destination, the configuration detection unit 32 transmits a message from all sides where the other display apparatuses 2 are detected. Each of the display apparatuses 2 that has received the message transmits the same message ID to the other display apparatuses 2 only once, except for the side where the message was received. By repeating such operations, a display apparatus 2 having a destination terminal ID can receive information. It is favorable that the destination display apparatus 2 transmits an acknowledgment back to the source display apparatus 2.

Once any one of the other display apparatuses 2 has received the arrangement information, this display apparatus 2 may generate information on a path to a destination display apparatus 2, to transmit data to be transmitted. This display apparatus 2 determines the arranged position of the destination display apparatus 2 from the arrangement information in which the terminal ID is associated. Further, a path is generated from the arranged position of this display apparatus 2 to the arranged position at which the destination display apparatus 2 is arranged in a format of, for example, (2,2) to (1,2) to (1,1), or the like. The destination display apparatus 2 that has received the data to be transmitted and the path information, transmits the data to be transmitted and the path information to the infrared I/F 223 that is connected with a display apparatus 2 located at an arranged position next to the arranged position of the display apparatus in the path information.

<Example of Display of Operation Commands>

Figure 15:
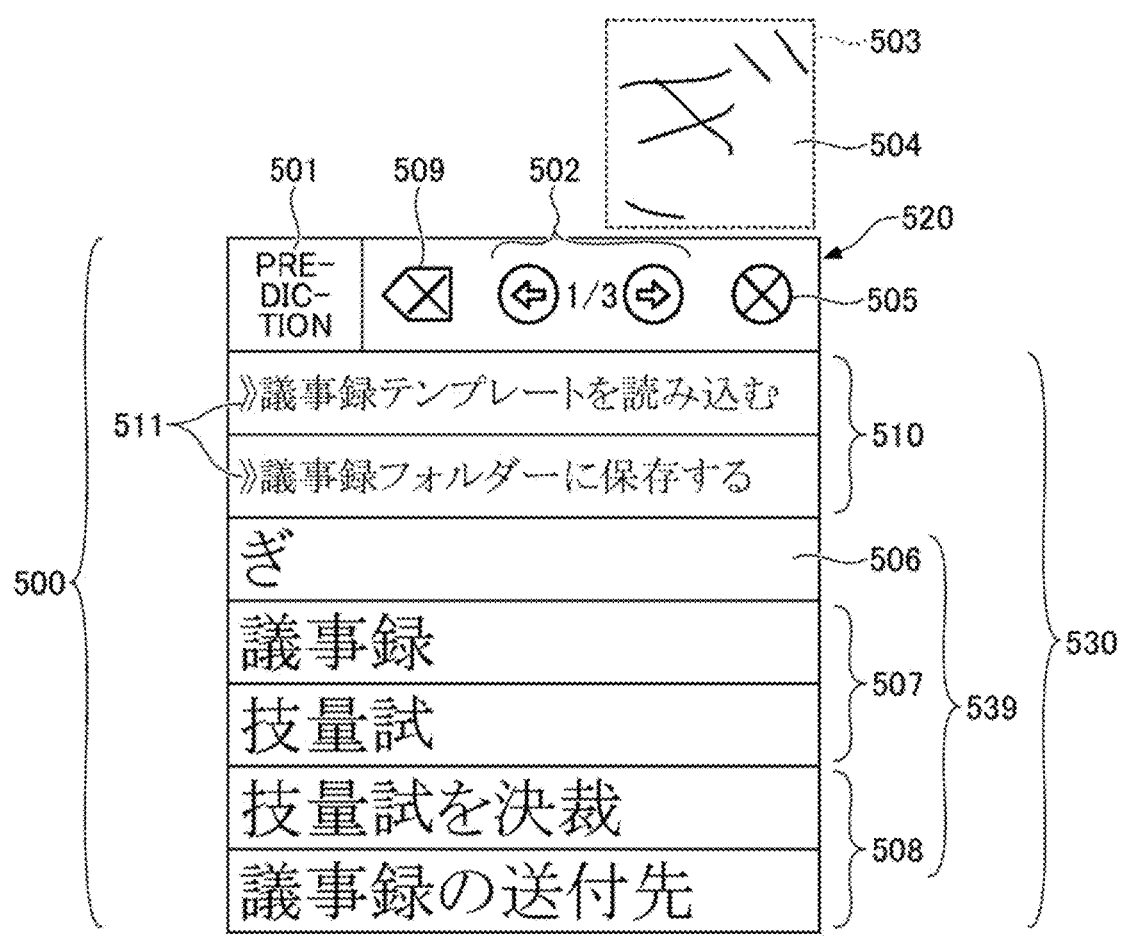
FIG. 15 is a diagram illustrating an example of an operation guide and selectable candidates displayed on the operation guide.

Next, with reference to FIG. 15, an operation guide 500 to be displayed when converting handwritten data will be described. FIG. 15 is a diagram illustrating an example of an operation guide 500 and selectable candidates 530 displayed on the operation guide. When the user writes by hand handwritten data 504, the operation guide 500 is displayed. The operation guide 500 includes an operation header 520, candidate operation commands 510, a candidate string of recognized handwriting 506, candidate conversion strings 507, predictive candidate conversion strings 508, and a rectangular display area 503 of handwritten data. Selectable candidates 530 include the candidate operation commands 510, the candidate string of recognized handwriting 506, the candidate conversion strings 507, and the predictive candidate conversion strings 508. Also, the selectable candidates 530 except for the candidate operation commands 510 will be also referred to as candidate strings 539.

The operation header 520 includes buttons 501, 509, 502, and 505. The button 501 receives a switching operation between predictive conversion and kana conversion. In the example in FIG. 15, in response to a user operation of pressing the button 509 labeled PREDICTION, the operation reception unit 29 receives the operation, and the display control unit 26 changes the display of the button 509 to be labeled KANA. After the change, the candidate strings 539 is listed in descending probability order of "kana conversion".

The button 502 is provided for paging operations of candidates to be displayed. In the example in FIG. 15, there are three pages of candidates to be displayed, and currently, page 1 is displayed. The button 505 receives an operation of erasing the operation guide 500. In the case where the user presses button 505, the operation reception unit 29 receives the operation, and the display control unit 26 erases the display except for the handwritten data. The button 509 receives an operation of collectively erasing the relevant display. In the case where the user presses the button 509, the operation reception unit 29 receives the operation, the display control unit 26 erases the entire display illustrated in FIG. 15 including the handwritten data, to allow the user to perform writing by hand from the beginning.

The handwritten data 504 is a Japanese hiragana character pronounced as "gi" written by hand by the user. The rectangular display area 503 of handwritten data surrounding the handwritten data 504 is displayed. In FIG. 15, although the operation guide 500 is displayed in response to input of a single character, the operation guide 500 is displayed at a timing when the user interrupts handwriting. Therefore, any number of characters can be included in the handwritten data 504.

In the candidate string of recognized handwriting 506, the candidate conversion strings 507, and the predictive candidate conversion strings 508, the respective candidate conversion strings are listed in descending probability order. The Japanese hiragana character pronounced as "gi" as the candidate string of recognized handwriting 506 is a candidate of the recognition result. In this example, the Japanese hiragana character pronounced as "gi" is recognized correctly.

The candidate conversion strings 507 are candidate conversion strings (e.g., a phrase including Japanese kanji character pronounced as "gi") that are converted from the result of kana/kanji conversion of "gi" (e.g., a kanji pronounced as "gi"). A word of three kanjis pronounced as "gi-ryou-shi" in this example is an abbreviation of "gijyuturyousan-shisaku" (meaning "prototyping for technical mass production" in English). The predictive candidate conversion strings 508 are predictive candidate conversion strings converted from the candidate conversion strings 507. In this example, a phrase in Japanese meaning "gi-ryou-shi is approved" and a phrase in Japanese meaning "addressee of the minutes" are displayed, because both phrases start with a sound of "gi" in Japanese.

The candidate operation commands 510 are candidate operation commands defined in advance (file operations in FIG. 15, editing commands of text, etc.) that are displayed according to the recognized characters. The header characters ">>" 511 indicate that these are the candidate operation commands. In FIG. 15, a Japanese word meaning "minutes" as a candidate string including the Japanese hiragana character pronounced as "gi" partially matches a defined keyword (see FIG. 16); therefore, these are displayed as the candidate operation commands 510.

Once the user selects one of the commands meaning "Read templates for minutes", the operation command defined in the definition data is executed. In this way, candidate operation commands are displayed in the case where operation command definition data including the converted string is found; therefore, these are not displayed at all times.

As illustrated in FIG. 15, candidate strings and candidate operation commands are displayed simultaneously (together); therefore, the user can select both a candidate string and an operation command that the user intends to input.

FIG. 16 is a diagram illustrating an example of operation command definition data held in the operation command processing unit 31. The operation command includes fields of an operation command name (Name); a defined keyword (String) that may partially match a candidate string; an operation command string (Command) to be executed; and a field (MD) that indicates whether this is operation command related to multi-displaying defining data. "%~%" in an operation command string is a variable that is associated with an item of system definition data in advance. In other words, "%~%" is replaced with a corresponding item of the system definition data.

First, the operation command definition data 701 indicates that the operation command name is "Read templates for minutes"; the string that partially matches a candidate string is a Japanese word meaning "minutes" or a Japanese word meaning "template"; and the operation command string to be executed is "ReadFile https://%username%:%password%@server.com/template/minutes.pdf". In this example, the operation command string to be executed includes "%~%" as items of the system definition data, where "%username%" and "%password%" are to be replaced with specific items of the system definition data (a user name and a password identified by an account). Therefore, the operation command string that is ultimately executed is a string of "ReadFile https://taro.tokkyo:x2PDHTyS@server.com/template/minutes.pdf" that corresponds to an operation (ReadFile) of reading a file specified as "https://taro.tokkyo:x2PDHTyS@server.com/template/minutes.pdf".

The operation command definition data 702 indicates that the operation command name is "Save in the minutes folder"; the string that partially matches a candidate string is a Japanese word meaning "minutes" or a Japanese word meaning "save"; and the operation command string to be executed is "WriteFile https://%username%:%password%@server.com/minutes/%machinename%_%yyyy-mm-dd%.pdf". As in the case of the operation command definition data 701, "%username%", "%password%", and "%machinename%" in the operation command string are replaced with specific items of the system definition data. Note that "%yyyy-mm-dd%" is to be replaced with the current date. For example, if the current date is Jan. 1, 2020, it is replaced with "2020-01-01". The operation command string that is ultimately executed is "WriteFile https://taro.tokkyo:x2PDHTyS@server.com/minutes/%My-Machine_2020-01-01.pdf", that stores (WriteFile) the minutes in a file specified as "https://taro.tokkyo:x2PDHTyS@server.com/minutes/%My-Machine_2020-01-01.pdf".

The operation command definition data 703 indicates that the operation command name is "print"; the string that partially matches a candidate string is a Japanese word meaning "print" or "printing", and the operation command string to be executed is "PrintFile https://%username%:%password%@server.com/print/%machinename%-"%yyyy-mm-dd%.pdf". Once the operation command string is replaced in substantially the same way as in the case of the operation command definition 702, the operation command string that is ultimately executed is "PrintFile https://taro.tokkyo:x2PDHTyS@server.com/print/%My-Machine_2020-01-01.pdf" that corresponds to an operation (PrintFile) of printing a file specified as "https://taro.tokkyo:

x2PDHTyS@server.com/print/%My-Machine_2020-01-01.pdf". In other words, the file is transmitted to a server. When the user causes the printer to communicate with the server, and specifies a file, the printer prints the contents of the file on paper.

As such, the operation command definition data 701 to 703 can be identified from candidate strings; therefore, operation commands can be displayed in response to writing by hand by the user. Also, in the case where authentication of the user has been successful, "%username%", "%password%", and the like of the operation command definition data are replaced with specific items of the user information; therefore, a file can be input and output in association with the user.

As will be described later, by having operation commands related to multi-displaying definition data defined, on the operation guide 500, the operation commands to be used when enabling the multi-displaying or when switching the operation mode are displayed.

<Sharing Handwritten Data>

Figure 17:
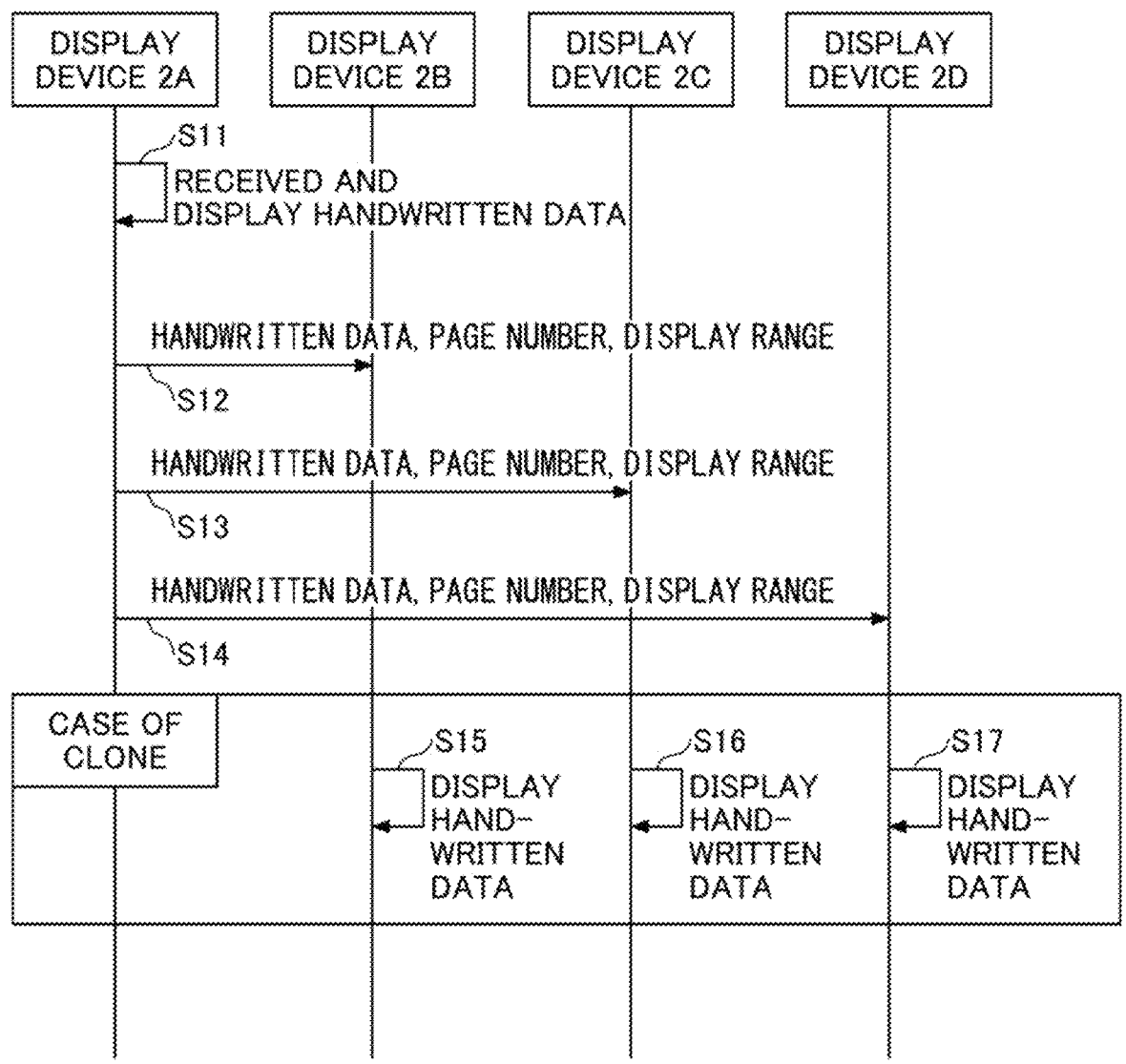
FIG. 17 is an example of a sequence chart illustrating steps executed by each display apparatus to share handwritten data.

Next, with reference to FIG. 17, sharing of handwritten data in the multi-displaying will be described. FIG. 17 is an example of a sequence chart illustrating steps executed by each display apparatus 2 to share handwritten data. Note that handwritten data is shared regardless of the operation mode.

S11: the contact position detection unit 21 of the display apparatus 2A receives input of handwritten data. The drawing data generation unit 22 connects the coordinate points, to generate a stroke. The display control unit 26 displays the stroke on the display.

S12 to S14: based on the arrangement information, the network communication unit 28 of the display apparatus 2A transmits the handwritten data with setting the destinations to the IP addresses of the other display apparatuses 2B to 2D. Also, based on the definition information corresponding to the operation mode, the network communication unit 28 transmits page numbers and display ranges to be displayed on the respective display apparatuses 2 to the respective display apparatuses 2. Each of the display apparatuses 2 stores the handwritten data in the storage unit 30. Note that the network communication unit 28 can transmit the page numbers and the display ranges not only at a timing when the handwritten data is received, but also regularly, to the respective display apparatuses 2.

S15: in the case where the operation mode is Cloning, new handwritten data is included in the page number and the display range to be instructed to each of the display apparatuses 2B to 2D. Therefore, the drawing data generation unit 22 connects the coordinate points, and displays the received handwritten data.

In the case where the operation mode is not Cloning, but Multi-paging or Tiling, new handwritten data is not included in the page number and the display range to be instructed to the display apparatuses 2B to 2D; therefore, the display apparatuses 2B to 2D do not display handwritten data. However, page data is shared at all times; therefore, each of the display apparatuses 2 can display all pages in the case where connection for the multi-displaying is released.

Also, in FIG. 17, although handwriting is performed on the master display, the sequence is substantially the same in the case where handwriting is performed on a sub-display. The sub-display transmits the handwritten data to the other display apparatuses 2. The master display has already determined the page number and the display range to be displayed on the master device, and each sub-display has received a command of the page number and the display range from the master display. Therefore, in the case where the operation mode is Cloning, the other display apparatuses 2 and the master display the handwritten data. In the case where the operation mode is Multi-paging or Tiling, only the sub-display on which handwriting is performed displays the handwritten data.

<Example of Display in Multi-Displaying>

In the following, some examples of operation commands that are displayed when character recognition is applied to handwritten data, will be described. Note that although the user can write a defined keyword anywhere on the four displays, for the sake of simplifying the description, it is assumed that handwriting is performed on the master display. Note that handwritten data is shared by all the display apparatuses 2.

Writing a Japanese Word Meaning "Multi" by Hand

FIG. 18 is a diagram illustrating an example of operation command definition data for displaying operation commands related to the multi-displaying by the display control unit 26. First, in the operation command related to the multi-displaying definition data, MD="ON" is set. The operation command having MD="ON" is displayed in the case where the configuration detection unit 32 detects a connection to another display apparatus 2. The configuration detection unit 32 saves a flag indicating that a connection to another display apparatus 2 is detected (a detection state checked regularly is reflected in the flag in real time), and by checking the saved flag, checks whether there is a connection. In the case of the infrared I/F 223 being absent (see FIG. 40), a similar flag set by the user is checked.

In the operation command definition data 711 to 713, a Japanese word meaning "multi" is set in the field of String (defined keyword). Therefore, if the user writes a Japanese word meaning "multi" by hand, based on the operation command definition data 711, the operation command of Cloning is displayed on the operation guide 500. Similarly, based on the operation command definition data 712, the operation command of Multi-paging is displayed on the operation guide 500. Similarly, based on the operation command definition data 713, the operation command of Tiling is displayed on the operation guide 500.

Figure 19:
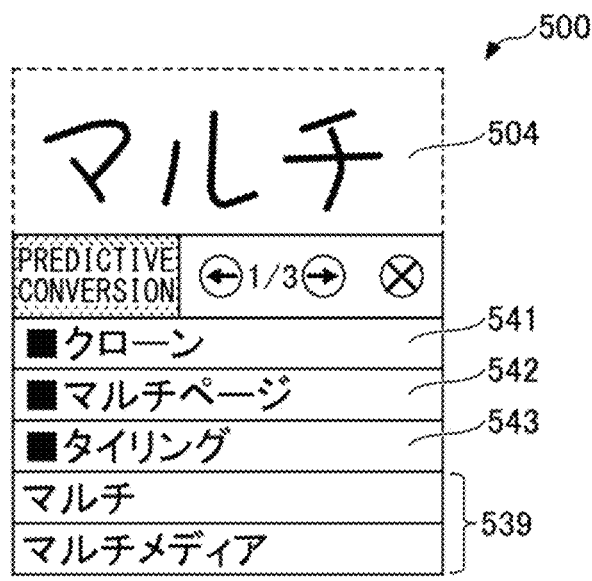
FIG. 19 is a diagram illustrating an example of an operation guide displayed in the case where the user writes a Japanese word meaning "multi" by hand.

FIG. 19 is a diagram illustrating an example of an operation guide 500 displayed in the case where the user writes a Japanese word meaning "multi" by hand. The Japanese word meaning "multi" of the handwritten data 504 is a defined keyword that encompasses all operation modes of the multi-displaying; therefore, the operation command processing unit 31 displays three operation modes ("Cloning" 541, "Multi-paging" 542, and "Tiling" 543) of the multi-displaying. Also, candidate strings 539 including the Japanese word meaning "multi" are also displayed.

If the user selects "Cloning" 541, the operation reception unit 29 receives the selection, and then, the multi-display control unit 33 of the master display transmits a page number and a display range to each of the other display apparatuses 2, according to the definition information on the "Cloning" 541, as follows:

The display apparatus 2B . . . the page number: the same page as in the master device, the display range: the same display range as in the master display;

The display apparatus 2C . . . the page number: the same page as in the master device, the display range: the same display range as in the master display; and The display apparatus 2D . . . the page number: the same page as in the master device, the display range: the same display range as in the master display.

If the user selects "Multi-paging" 542, the operation reception unit 29 receives the selection, and then, the multi-display control unit 33 of the master display transmits a page number and a display range to each of the other display apparatuses 2, according to the definition information on the "Multi-paging" 542 and the arrangement information. Note that as illustrated in the definition information 602 in FIG. 7C, the page number is incremented by one firstly in the column direction, and when reaching the rightmost position, the row number is incremented by one, as "(1,1) (1,2) (2,1) (2,2)".

The display apparatus 2B . . . the page number: the page of the master device +1, the display range: any range;

The display apparatus 2C . . . the page number: the page of the master device +2, the display range: any range; and The display apparatus 2D . . . the page number: the page of the master device +3, the display range: any range.

If the user selects "Tiling" 543, the operation reception unit 29 receives the selection, and then, the multi-display control unit 33 of the master display transmits a page number and a display range to each of the other display apparatuses 2, according to the definition information on the "Tiling" 543 and the arrangement information.

The display apparatus 2A . . . the page number: the page of the master device, the display range: 0 to $X_1$ and 0 to $Y_1$ on the page;

The display apparatus 2B . . . the page number: the page of the master device, the display range: $X_1$ to $2X_1$ and 0 to $Y_1$ on the page;

The display apparatus 2C . . . the page number: the page of the master device, the display range: 0 to $X_1$ and $Y_1$ to $2Y_1$ on the page; and The display apparatus 2D . . . the page number: the page of the master device, the display range: $X_1$ to $2X_1$ and $Y_1$ to $2Y_1$ on the page.

Writing a Japanese Word Meaning "Tile" by Hand

Figure 20:
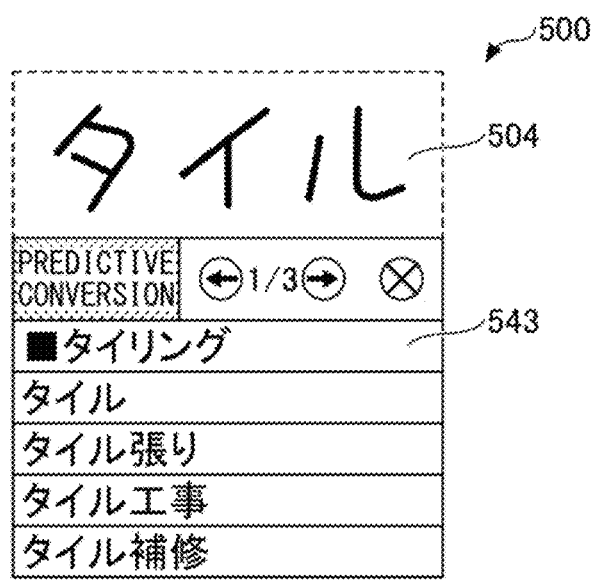
FIG. 20 is a diagram illustrating an example of an operation guide displayed in the case where the user writes a Japanese word meaning "tile" by hand.

FIG. 20 is a diagram illustrating an example of an operation guide 500 displayed in the case where the user writes a Japanese word meaning "tile" by hand. The Japanese word meaning "tile" is a defined keyword included in the field of String of the operation command definition data 713 of Tiling; therefore, the operation command processing unit 31 displays the operation command of Tiling. If the user selects Tiling, the operation reception unit 29 receives the selection, and then, the multi-display control unit 33 of the master display transmits a page number and a display range to each of the other display apparatuses 2, according to the definition information on the Tiling and the arrangement information.

Writing a Japanese Word Meaning "Same" by Hand

Figure 21:
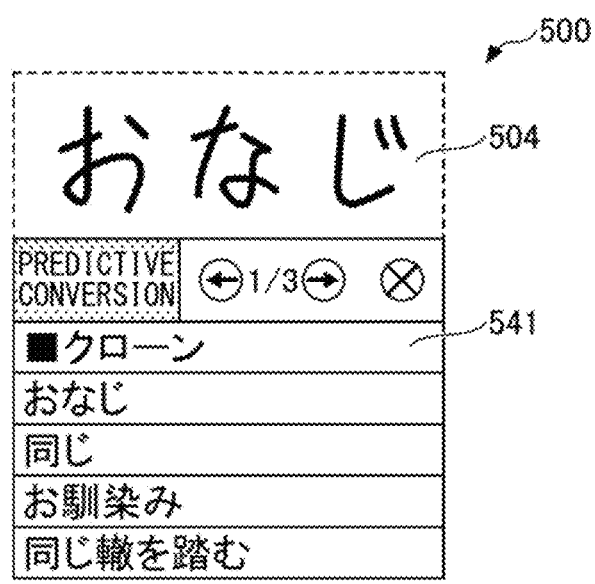
FIG. 21 is a diagram illustrating an example of an operation guide displayed in the case where the user writes a Japanese word meaning "same" by hand.

FIG. 21 is a diagram illustrating an example of an operation guide 500 displayed in the case where the user writes a Japanese word meaning "same" by hand. The Japanese word meaning "same" is a defined keyword included in the field of String of the operation command definition data 711 of Cloning; therefore, the operation command processing unit 31 displays the operation command of Cloning. If the user selects Cloning, the operation reception unit 29 receives the selection, and then, the multi-display control unit 33 of the master display transmits a page number and a display range to each of the other display apparatuses 2, according to the definition information on the Cloning and the arrangement information.

Writing a Japanese Word Meaning "Arrange" by Hand

Figure 22:
FIG. 22 is a diagram illustrating an example of an operation guide displayed in the case where the user writes a Japanese word meaning "arrange" by hand.

FIG. 22 is a diagram illustrating an example of an operation guide displayed in the case where the user writes a Japanese word meaning "arrange" by hand. The Japanese word meaning "arrange" is a defined keyword included in the field of String of the operation command definition data 712 of Multi-paging; therefore, the operation command processing unit 31 displays the operation command of Multi-paging. If the user selects Multi-paging, the operation reception unit 29 receives the selection, and then, the multi-display control unit 33 of the master display transmits a page number and a display range to each of the other display apparatuses 2, according to the definition information on the Multi-paging and the arrangement information.

Writing a Japanese Word Meaning "Connect" by Hand

Figure 23:
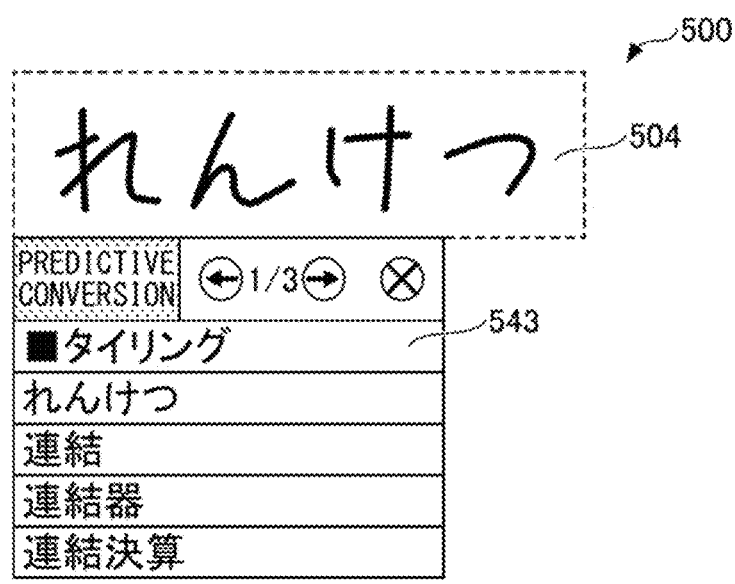
FIG. 23 is a diagram illustrating an example of an operation guide displayed in the case where the user writes a Japanese word meaning "connect" by hand.

FIG. 23 is a diagram illustrating an example of an operation guide 500 displayed in the case where the user writes a Japanese word meaning "connect" by hand. The Japanese word meaning "connect" is a defined keyword included in the field of String of the operation command definition data 713 of Tiling; therefore, the operation command processing unit 31 displays the operation command of Tiling. If the user selects Tiling, the operation reception unit 29 receives the selection, and then, the multi-display control unit 33 of the master display transmits a page number and a display range to each of the other display apparatuses 2, according to the definition information on the Tiling and the arrangement information.

Writing a Japanese Word Meaning "Order" by Hand

FIGS. 24A to 24D are diagrams illustrating definition information on operation commands referred to as "display in Z-shaped order" and "display in inverted-N-shaped order". FIG. 24A illustrates definition information 604 used by the operation command of "display in Z-shaped order"; and FIG. 24B illustrates an example of display of pages displayed on the respective display apparatuses 2. FIG. 24C illustrates definition information 605 used by the operation command of "display in inverted-N-shaped order"; and FIG. 24D illustrates an example of display of pages displayed on the respective display apparatuses 2. The arrangement information indicates the arrangement of the display apparatuses 2; therefore, the multi-display control unit 33 can transmit page numbers to the respective display apparatuses 2.

As can be seen in FIG. 24A to 24D, "display in Z-shaped order" and "display in inverted-N-shaped order" are aspects of Multi-paging. Therefore, these are also operation modes.

FIG. 25 is a diagram illustrating an example of operation command definition data for displaying operation commands related to the multi-displaying by the display control unit 26. In the operation command definition data 714 and 715, a Japanese word meaning "order" is set in the field of String. Therefore, if the user writes a Japanese word meaning "order" by hand, based on the operation command definition data 714 and 715, the operation commands of "display in Z-shaped order" and "display in inverted-N-shaped order" are displayed on the operation guide 500.

Figure 26:
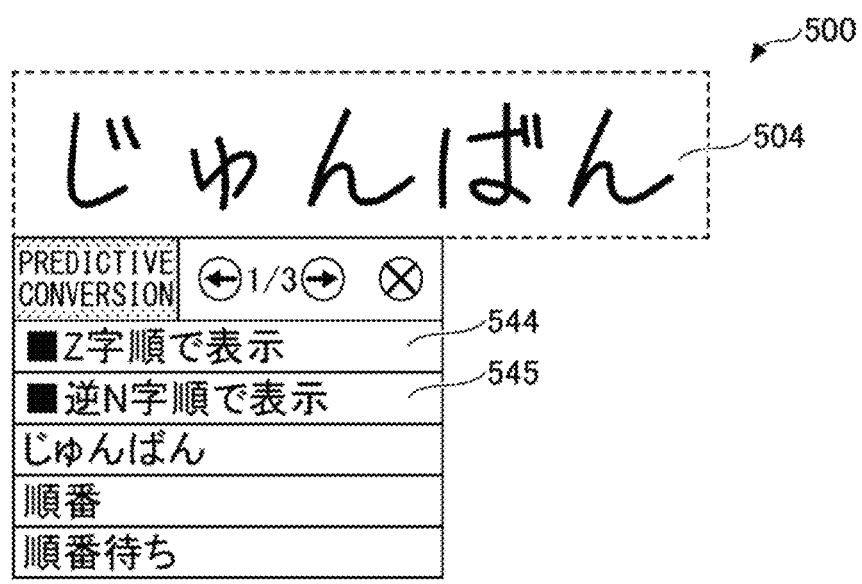
FIG. 26 is a diagram illustrating an example of an operation guide displayed in the case where the user writes a Japanese word meaning "order" by hand.

FIG. 26 is a diagram illustrating an example of an operation guide 500 displayed in the case where the user writes a Japanese word meaning "order" by hand. The Japanese word meaning "order" is a defined keyword included in the field of String of the operation command definition data 714 and 715; therefore, the operation command processing unit 31 displays the operation commands of "display in Z-shaped order" 544 and "display in inverted-N-shaped order" 545. If the user selects "display in Z-shaped order" 544 or "display in inverted-N-shaped order" 545, the operation reception unit 29 receives the selection, and then, the multi-display control unit 33 of the master display transmits a page number and a display range to each of the other display apparatuses 2, according to the definition information on "display in Z-shaped order" or "display in inverted-N-shaped order", and the arrangement information.

Writing a Japanese Word that May Mean "Turn" by Hand

FIGS. 27A to 27D are diagrams illustrating operation commands referred to as "one-page turning" and "two-page turning". FIG. 27A illustrates page numbers displayed on the respective display apparatuses 2, before an operation command of "one-page turning" or "two-page turning" is selected. FIG. 27B illustrates page numbers displayed on the respective display apparatuses 2, in the case where the operation command of "one-page turning" is executed. FIG. 27C illustrates page numbers displayed on the respective display apparatuses 2, in the case where the operation command of "two-page turning" is executed.

FIG. 27D illustrates definition information 606 of the operation commands "one-page turning" and "two-page turning". In the case of "one-page turning", based on the arrangement information, P1 to P2 is set in the display apparatus 2A, and P2 to P3 is set in the display apparatus 2B. In the case of "two-page turning", based on the arrangement information, P1 to P3 is set in the display apparatus 2A, and P2 to P4 is set in the display apparatus 2B.

As can be seen in FIGS. 27A to 27D, "one-page turning" and "two-page turning" are aspects of Multi-paging. Therefore, these are also operation modes.

FIG. 28 is a diagram illustrating an example of operation command definition data for displaying operation commands related to the multi-displaying by the display control unit 26. In the operation command definition data 716 and 717, a Japanese word that may mean "turn" is set in the field of String. Therefore, if the user writes a Japanese word that may mean "turn" by hand, based on the operation command definition data 716 and 717, the operation commands of "one-page turning" and "two-page turning" are displayed on the operation guide 500.

Figure 29:
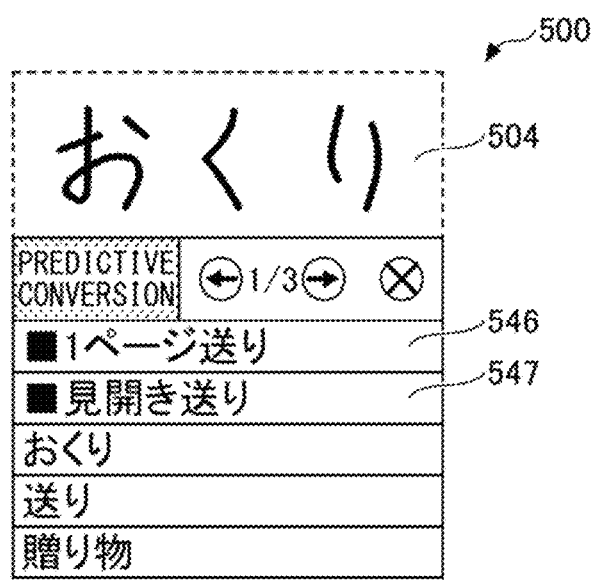
FIG. 29 is a diagram illustrating an example of an operation guide displayed in the case where the user writes a Japanese word that may mean "turn" by hand.

FIG. 29 is a diagram illustrating an example of an operation guide 500 displayed in the case where the user writes a Japanese word that may mean "turn" by hand. The Japanese word that may mean "turn" is a defined keyword included in the field of String of the operation command definition data 716 and 717; therefore, the operation command processing unit 31 displays the operation commands of "one-page turning" 546 and "two-page turning" 547. If the user selects "one-page turning" 546 or "two-page turning" 547, the operation reception unit 29 receives the selection, and then, the multi-display control unit 33 of the master display transmits a page number and a display range to each of the other display apparatuses 2, according to the definition information on "one-page turning" or "two-page turning".

Writing a Japanese Word Meaning "Bigger" by Hand

A case will be described in which the user enlarges or reduces a page with handwritten data.

FIG. 30 is a diagram illustrating an example of operation command definition data for displaying operation commands related to the multi-displaying by the display control unit 26. In the operation command definition data 718 and 719, a Japanese word meaning "bigger" is set in the field of String. Therefore, if the user writes a Japanese word meaning "bigger" by hand, based on the operation command definition data 718 and 719, the operation commands of "enlarge (200%)" and "enlarge (400%)" are displayed on the operation guide 500.

The operation commands of "enlarge (200%)" and enlarge (400%) are not an operation mode. Also, displaying by these command are executed regardless of the multi-displaying function being enabled or disabled. Therefore, in any operation mode, the display control unit 26 enlarges and displays the page data.

Figure 31:
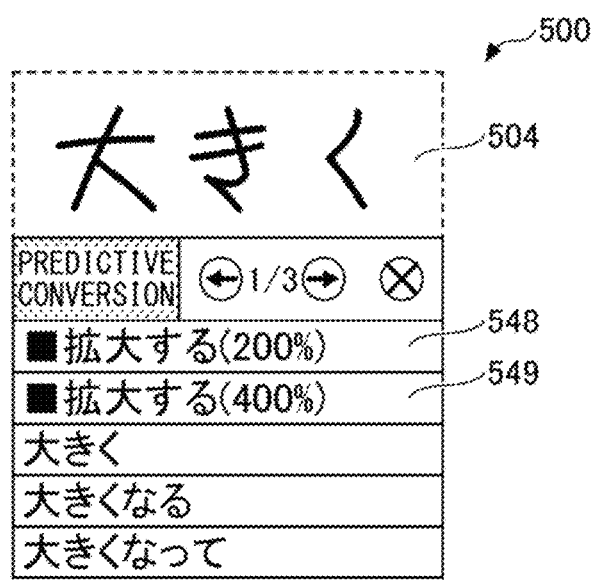
FIG. 31 is a diagram illustrating an example of an operation guide displayed in the case where the user writes a Japanese word meaning "bigger" by hand.

FIG. 31 is a diagram illustrating an example of an operation guide 500 displayed in the case where the user writes a Japanese word meaning "bigger" by hand. The Japanese word meaning "bigger" is a defined keyword included in the field of String of the operation command definition data 718 and 719; therefore, the operation command processing unit 31 displays the operation commands of "enlarge (200%)" 548 and "enlarge (400%)" 549. If the user selects "enlarge (200%)" 548 or "enlarge (400%)" 549, the operation reception unit 29 receives the selection, and then, the display control unit 26 enlarges the handwritten data while staying in the current operation mode.

Figure 32A:
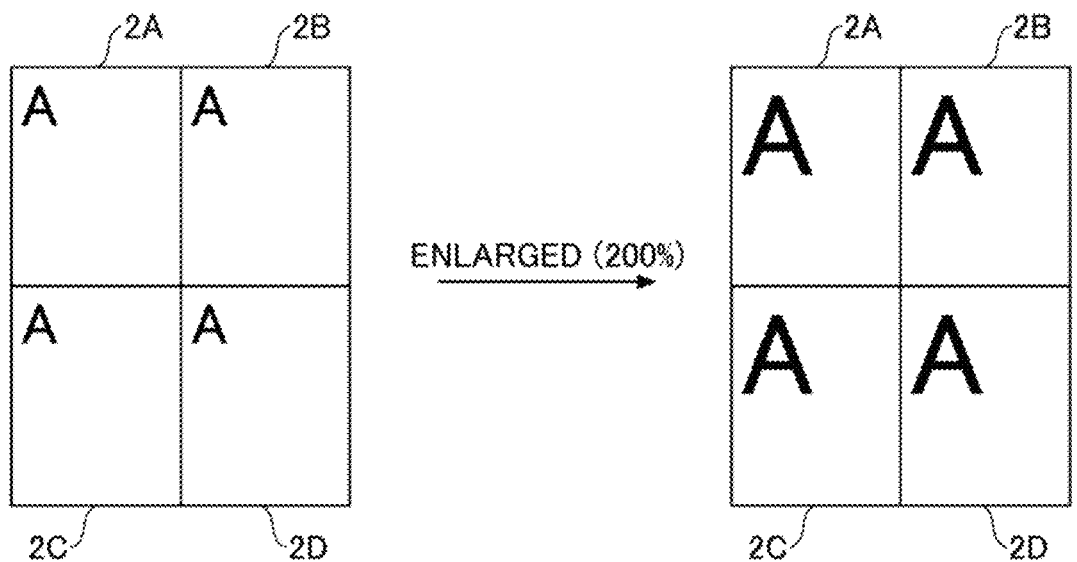
FIGS. 32A and 32B are diagrams illustrating examples of displays of pages in the case where an operation command of "enlarge (200%)" is selected.
Figure 32B:
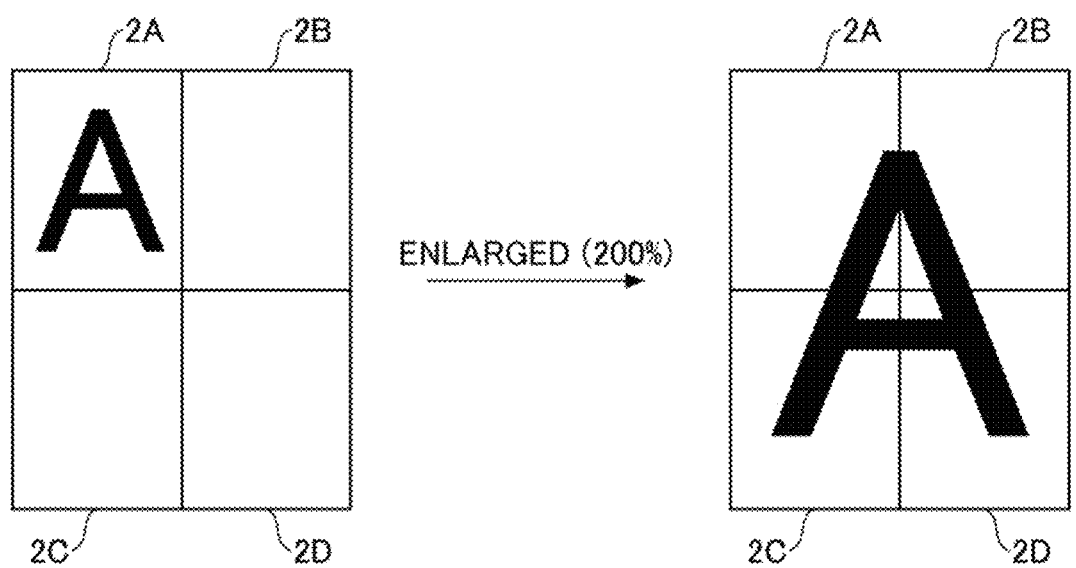

FIGS. 32A and 32B are diagrams illustrating examples of displays of pages in the case where an operation command of "enlarge (200%)" is selected. FIG. 32A is an example of enlargement in the case where the operation mode is Cloning. As the operation mode is Cloning, each of the display apparatuses 2A to 2D displays "A". When the operation command of "enlarge (200%)" 548 is executed, the multi-display control unit 33 enlarges the page by an enlargement factor of two, and calculates a display range for each of the display apparatuses 2. Each of the display apparatuses 2B to 2D enlarges the image data by the enlargement factor of two indicated from the display apparatus 2A, and displays the instructed display range of the image data. Note that in the case where the operation mode is Multi-paging, similar enlargement is executed as in FIG. 32A although parts of the page displayed on the respective display apparatuses 2 are different.

FIG. 32B is an example of enlargement in the case where the operation mode is Tiling (see FIG. 9). As the operation mode is Tiling, the entirety of the display apparatuses 2 display one page ("A"). When the operation command of "enlarge (200%)" 548 is executed, the multi-display control unit 33 enlarges the page by an enlargement factor of two, and calculates a display range for each of the display apparatuses 2. The display apparatus 2A transmits the enlargement factor and a display range calculated by the multi-display control unit 33 to the each of the display apparatuses 2; therefore, the page can be enlarged twofold in the state of Tiling.

Note that in the operation command definition data 720 and 721 in FIG. 30, a Japanese word meaning "a bit" and a Japanese word meaning "a little" are set in the fields of String. Therefore, if the user writes a Japanese word meaning "a bit" or "a little" by hand, based on the operation command definition data 720 and 721, the operation commands of "enlarge (110%)" and "enlarge (120%)" are displayed on the operation guide 500. As such, if defined keywords are provided in accordance with enlargement factors, it becomes easier for the user to adjust to the enlargement factor as desired.

Specifying Sheet Size

In the case where the user wants to specify a sheet size when enlarging a page, the user may write the sheet size by hand.

FIG. 33 is a diagram illustrating an example of operation command definition data for displaying operation commands related to the multi-displaying by the display control unit 26. In the operation command definition data 722 and 723, "A1" is set in the field of String. Therefore, if the user writes "A1" by hand, based on the operation command definition data 722 and 723, the operation commands of "display by A1" and "create A1 page" are displayed on the operation guide 500.

Note that the operation command of "display by A1" can switch the operation mode to Tiling; therefore, it is an aspect of the operation mode. The operation command of "create A1 page" can switch the operation mode to a mixed state of Tiling and Multi-paging; therefore, it is an aspect of the operation mode.

Figure 34:
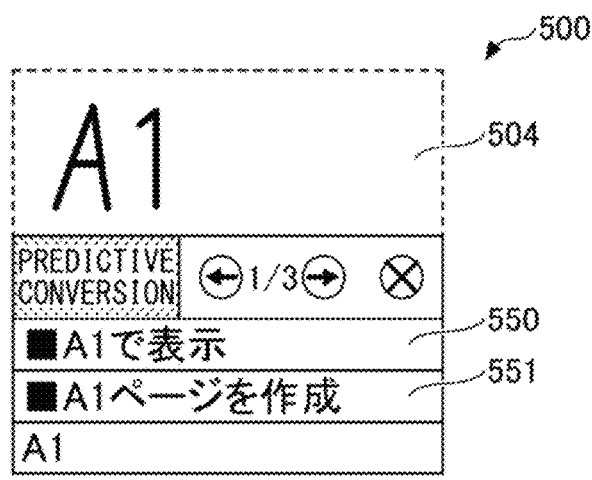
FIG. 34 is a diagram illustrating an example of an operation guide displayed in the case where the user writes "A1" by hand.

FIG. 34 is a diagram illustrating an example of an operation guide 500 displayed in the case where the user writes "A1" by hand. "A1" is a defined keyword included in the field of String of the operation command definition data 722 and 723; therefore, the operation command processing unit 31 displays the operation command of "display by A1" 550 and "create A1 page" 551. If the user selects "display by A1" 550 or "create A1 page" 551, the operation reception unit 29 receives the selection, and then, the multi-display control unit 33 of the master display transmits a page number and a display range to each of the other display apparatuses 2, according to the definition information on "display by A1" and "create A1 page" and the arrangement information.

Figure 35A:
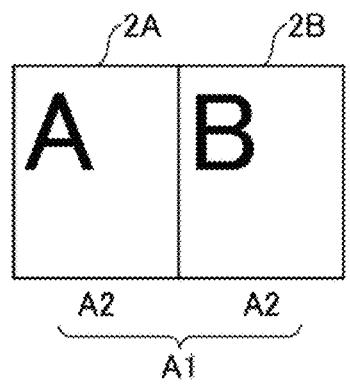
FIGS. 35A to 35D are diagrams illustrating a process in the case where an operation command of "display by A1" is executed.

FIGS. 35A to 35D are diagrams illustrating a process in the case where an operation command of "display by A1" is executed. FIG. 35A illustrates a display state before the user selects the operation command of "display by A1". There are two display apparatuses 2. For the sake of description, it is assumed that the size of each of the display apparatuses 2 is A2, and when the two display apparatuses 2 are connected, it becomes possible to display an image in A1 size. In FIG. 35A, the operation mode is Multi-paging, and the two display apparatuses 2 display separate pages. For example, although an image "A" on the page displayed on the display apparatus 2A has a resolution of A1 size, it is displayed in a reduced size. Alternatively, it has a resolution of A2 size, and is displayed in the actual size. In the case of desiring to confirm details of this page, the user executes the operation command of "display by A1".

Figure 35B:
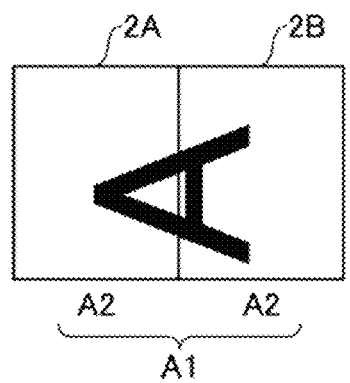

FIG. 35B illustrates a state where the operation command of "display by A1" has been executed. The operation mode becomes Tiling; therefore, the two display apparatuses 2 together display one page of "A" in A1 size.

In the case of executing the operation command of "display by A1", the multi-display control unit 33 determines the arrangement state of the multiple display apparatuses 2, the longitudinal and lateral lengths of one of the display apparatuses 2, and how many pages can be displayed depending on the longitudinal and lateral lengths of A1 size. The arranged state of the multiple display apparatuses 2 is associated in advance with the number of pages that can be displayed in A1 size, and the orientation of the pages, in a table. According to this table, in the case of two display apparatuses 2, one page can be displayed horizontally in A1 size.

Figure 35C:
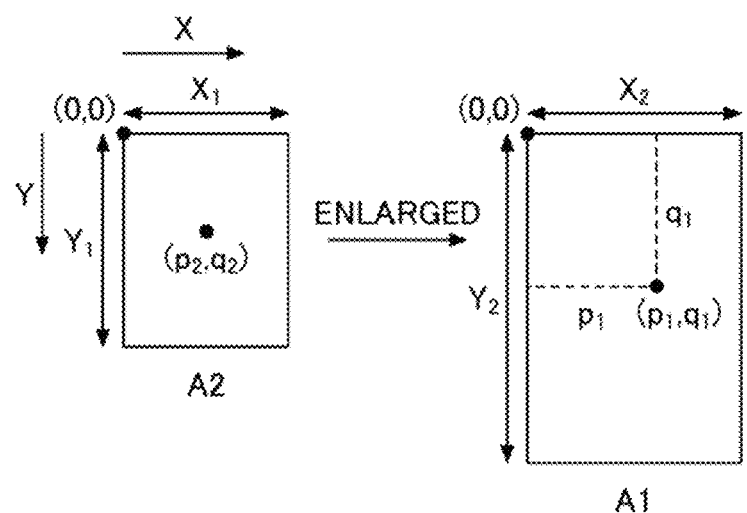

The multi-display control unit 33 enlarges the page in A2 size to A1 size. FIG. 35C is a diagram illustrating enlargement. Here, $X_1$, $X_2$, $Y_1$, and $Y_2$ are substantially the same as in FIG. 9. The origin is set to the upper left corner of the master display, and coordinates of a point in A2 size are denoted as (p2,q2). The coordinates (p1,q1) of the corresponding point in A1 size are expressed as follows:

$$p_1 = p_2 \times X_2 / X_1$$

$$q_1 = q_2 \times Y_2 / Y_1$$

Figure 35D:
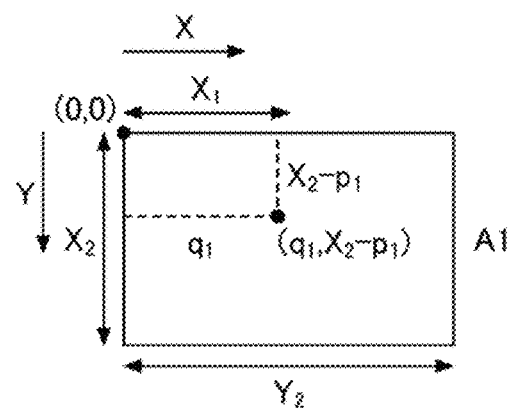

Also, in A1 size, the page is oriented laterally; therefore, $X_2$ corresponds to the longitudinal direction, and $Y_2$ corresponds the lateral direction. Also, in this case, the origin is set to the upper left corner of the master display. Therefore, as illustrated in FIG. 35D, the multi-display control unit 33 executes the following conversion:

$$p_1 \text{ to } q_1; \text{ and}$$

$$q_1 \text{ to } X_2 - p_1.$$

Among the coordinates of the page calculated in this way, based on the arrangement information, the multi-display control unit 33 indicates the coordinates $X_1$ and greater in the X direction, and the entire range in the Y direction as the display range, to the display apparatus 2B. The display apparatus 2B calculates coordinates in substantially the same way as the display apparatus 2A, to display data in the display range.

Figure 36A:
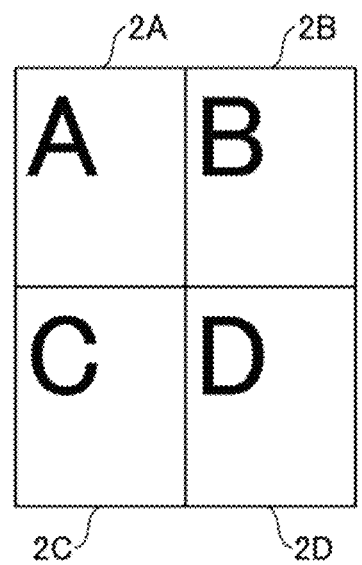
FIGS. 36A and 36B are diagrams illustrating a process in the case where an operation command of "create A1 page" is executed.
Figure 36B:
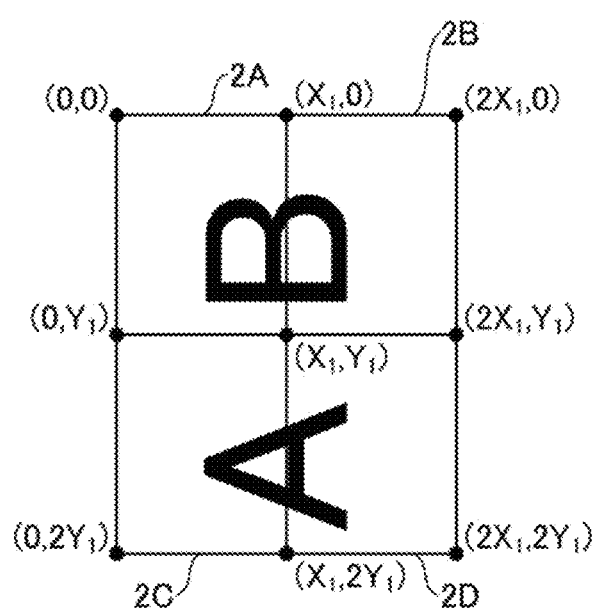

Next, FIGS. 36A and 36B are diagrams illustrating a process in the case where an operation command of "create A1 page" is executed. FIG. 36A illustrates a display state before the user selects the operation command of "create A1 page". There are four display apparatuses 2. For the sake of description, it is assumed that the size of each of the display apparatuses 2 is A2, and when the four display apparatuses 2 are connected, it becomes possible to display two images each in A1 size at the same time. In FIG. 36A, the operation mode is Multi-paging, and the four display apparatuses 2A to 2D display separate pages.

FIG. 36B illustrates an example of a display in the case where an operation command of "create A1 page" is executed. In the case of executing the operation command of "create A1 page", the multi-display control unit 33 refers to the table (in which the arranged state of the multiple display apparatuses 2, the number of pages in A1 size that can be displayed, and the orientation of the pages are associated), and determines that in the case of four display apparatuses 2, two pages each in A1 size can be displayed horizontally.

In this case, the operation mode becomes a mixed state of Multi-paging and Tiling, and the four display apparatuses 2A to 2D display two pages ("A" "B") each in A1 size.

The multi-display control unit 33 enlarges each pair of two pages in A2 size to A1 size. "B" on page 2 is the same page as in FIG. 35A. As for "A" on page 1, in Multi-paging, the coordinates are determined for each page; therefore, the origin is set to the upper left corner of the display apparatus 2C. Therefore, the same method of calculating coordinates can be applied as in the second page.

Among the calculated coordinates for page 2 ("B"), the multi-display control unit 33 indicates the coordinates $X_1$ and greater in the X direction, and the entire range in the Y direction as the display range, to the display apparatus 2B. The display apparatus 2B calculates coordinates in substantially the same way as the display apparatus 2A, to display data in the display range. Among the calculated coordinates for page 1 ("A"), the multi-display control unit 33 indicates the coordinates of 0 to $X_1$ in the X direction, and the entire range in the Y direction as the display range, to the display apparatus 2C. The display apparatus 2C calculates coordinates in substantially the same way as the display apparatus 2A, to display data in the display range. Similarly, the multi-display control unit 33 indicates the coordinates $X_1$ and greater in the X direction, and the entire range in the Y direction as the display range, to the display apparatus 2D. The display apparatus 2D calculates coordinates in substantially the same way as the display apparatus 2A, to display data in the display range.

Figure 37A:
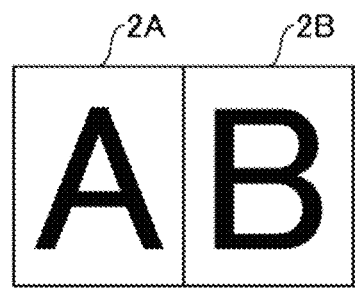
FIGS. 37A and 37B are diagrams illustrating a process in the case where an operation command of "create A3 page" is executed.
Figure 37B:
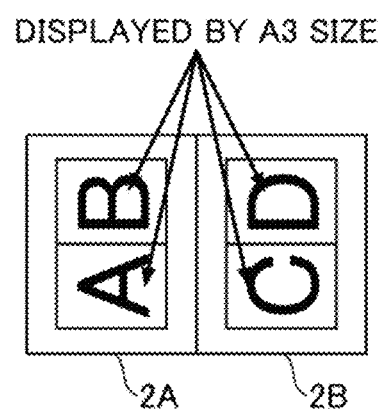

Next, FIGS. 37A and 37B are diagrams illustrating a process in the case where an operation command of "create A3 page" is executed. FIG. 37A illustrates a display state before the user selects the operation command of "create A3 page". There are two display apparatuses 2. For the sake of description, it is assumed that the size of each of the display apparatuses 2 is A2, and when the two display apparatuses 2 are connected, it becomes possible to display four images each in A3 size at the same time. In FIG. 37A, the operation mode is Multi-paging, and the two display apparatuses 2 display separate pages.

FIG. 37B illustrates an example of a display in the case where an operation command of "create A3 page" is executed. In the case of executing the operation command of "create A3 page", the multi-display control unit 33 refers to the table (in which the arranged state of the multiple display apparatuses 2, the number of pages in A3 size that can be displayed, and the orientation of the pages are associated), and determines that in the case of two display apparatuses 2, four pages each in A3 size can be displayed horizontally. The operation mode becomes Multi-paging, and the two display apparatuses 2 display four pages each in A3 size ("A", "B", "C", and "D"). Note that in this case, the state becomes the same as in aggregated printing (multiple pages are printed on one sheet).

Figure 38:
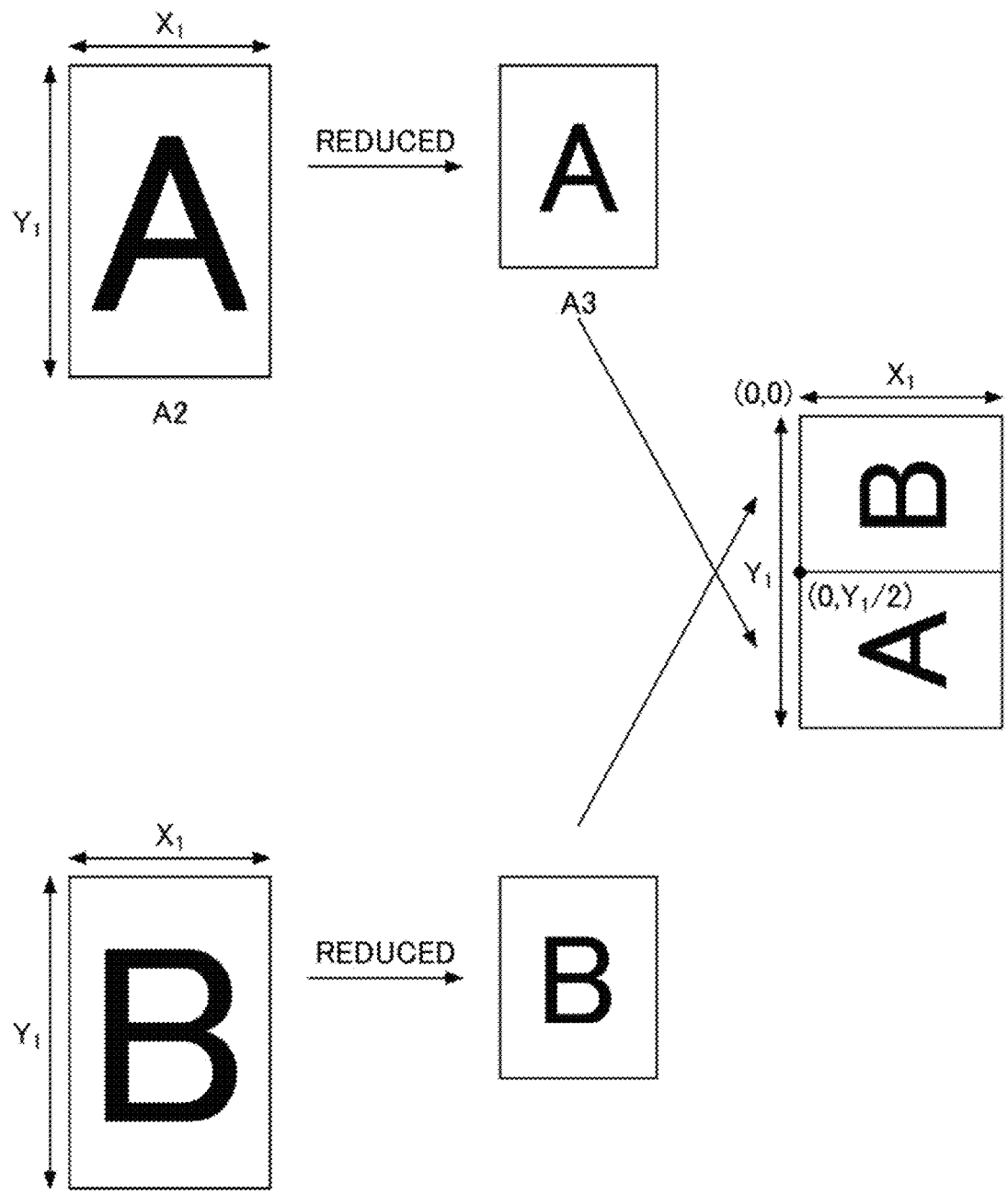
FIG. 38 is a diagram illustrating a method of calculating coordinates of each page.

FIG. 38 is a diagram illustrating a method of calculating coordinates of each page. The multi-display control unit 33 reduces each page, and calculates the coordinates after the reduction. Each page is oriented horizontally; therefore, coordinate conversion is applied to page 2 ("B") in substantially the same way as in FIG. 35A to 35D. As the origin is set to the upper left corner of the display apparatus 2A, for page 1 ("A"), the Y coordinate is enlarged by $Y_1/2$ after the coordinate conversion.

The multi-display control unit 33 transmits, for pages 3 and 4, a command to display pages 3 and 4 on the display apparatus 2B with the same coordinate conversion, to the display apparatus 2B. The display apparatus 2B applies the same coordinate conversion to pages 3 and 4, and displays pages 3 and 4.

<Overall Operational Steps>

Figure 39:
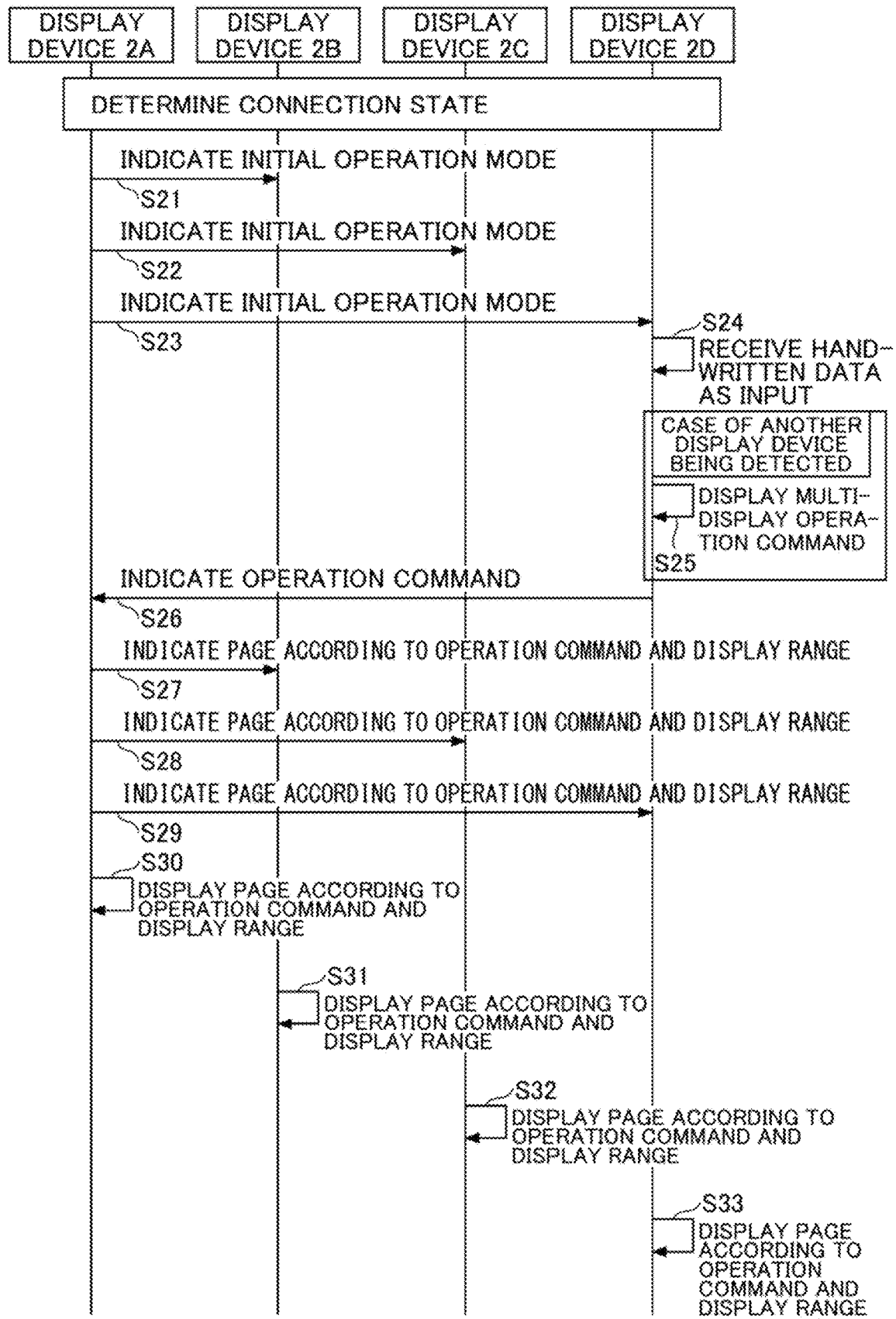
FIG. 39 is an example of a sequence chart illustrating steps executed by a display apparatus in the case of enabling a multi-displaying function or switching the operation mode.

FIG. 39 is an example of a sequence chart illustrating steps executed by the display apparatus 2 in the case of enabling the multi-displaying function or switching the operation mode. The process in FIG. 39 starts in a state where the master display has detected an arrangement.

S21 to S23: the multi-display control unit 33 of the master display transmits an initial operation mode that is determined in the case where multiple display apparatuses 2 are connected, to the display apparatuses 2B to 2D. If the initial operation mode is Multi-paging, the display apparatuses 2A to 2D do not need to change the display state. In the case where the initial operation mode is Cloning or Tiling, the pages and the display ranges are indicated.

S24: for example, the contact position detection unit 21 of the display apparatus 2D receives as input a defined keyword (handwritten data) related to the multi-displaying. Inputting a defined keyword can be made on any of the connected display apparatuses 2. Also, the display apparatuses 2A to 2D may display any pages, respectively.

S25: in the case where the configuration detection unit 32 of the display apparatus 2D has detected connections with the other display apparatuses 2, the operation command processing unit 31 obtains an operation command having MD="ON" related to the multi-displaying and other operation commands having MD="OFF" from the operation command definition data. Then, the display control unit 26 displays an operation guide 500 including operation commands related to the multi-displaying. In the case where the configuration detection unit 32 has not detected connections with the other display apparatuses 2, the operation command processing unit 31 obtains only operation commands having MD="OFF" from the operation command definition data. If the user selects an operation command related to the multi-displaying, the operation reception unit 29 receives the selection, and then, the display control unit 26 displays the operation command related to the multi-displaying only in the case of being connected with the other display apparatuses 2; therefore, no irrelevant operation command is displayed.

S26: in the case where the configuration detection unit 32 has detected connections to the other display apparatuses 2, based on the arrangement information, it is determined whether the display apparatus is the master display. If the arranged position is not (1,1), it is a sub-display. The network communication unit 28 of the display apparatus 2D transmits the received operation command to the display apparatus 2A as the master display. The operation command may be transmitted via the infrared I/F 223 or may be transmitted via a LAN.

S27 to S29: the network communication unit 28 of the display apparatus 2A receives the operation command. The multi-display control unit 33 executes the operation command related to the multi-displaying, specifically, transmits a page and a display range according to the operation command to each of the display apparatuses 2B to 2D (corresponding to a command to control data displayed on the display apparatuses 2B to 2D according to the operation command).

S30 to S33: the display control unit 26 of each of the display apparatuses 2A to 2D displays the page according to the operation command in the display range according to the operation mode.

<Method of Determining Arrangement in Case where Display Apparatus not Provided with Infrared I/F 223>

Even in the case where the display apparatuses 2 are not provided with the infrared I/F 223, the multi-displaying function can be implemented. As the display apparatuses 2 are not provided with the infrared I/F 223, the user sets an arrangement on each of the display apparatuses 2.

Figure 40A:
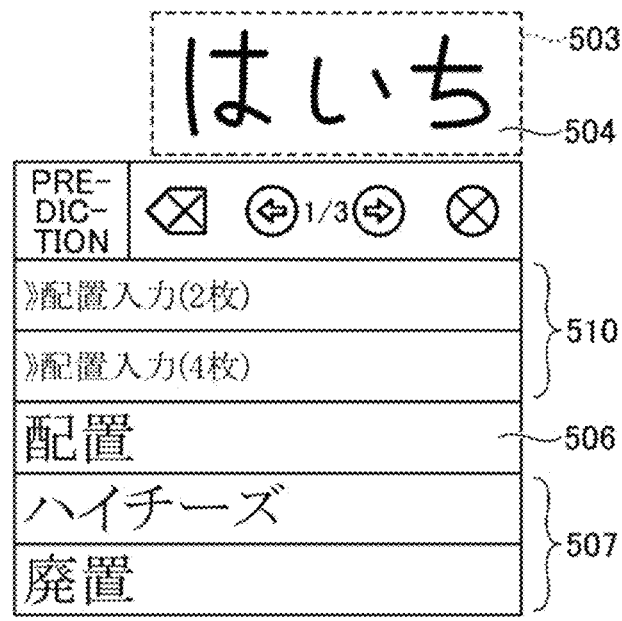
FIGS. 40A and 40B are diagrams illustrating a method of setting an arrangement position for each display apparatus, by the user.
Figure 40B:
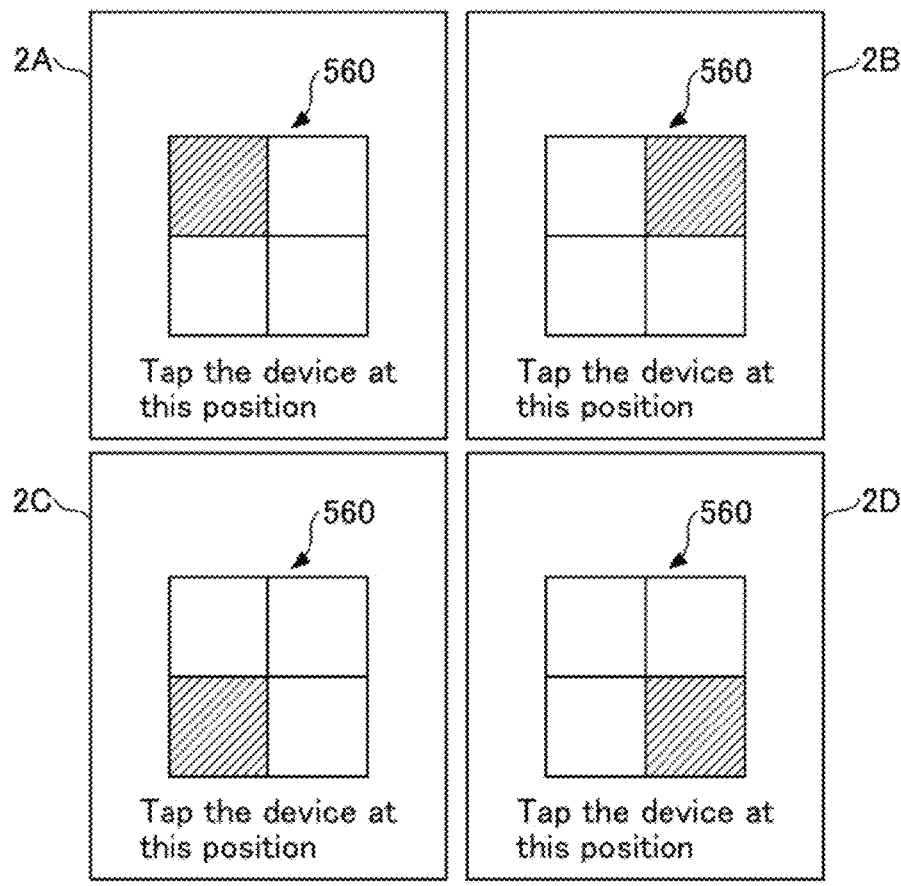

FIGS. 40A and 40B are diagrams illustrating a method of setting an arrangement position for each of the display apparatuses 2, performed by the user. The user causes the display apparatus to display, for example, an operation command of determining an arrangement by writing by hand. For example, in the case where "arrangement" is written by hand, an operation command for inputting an arrangement is displayed on the operation guide 500. FIG. 40A illustrates an example of an operation guide 500 including operation commands for inputting arrangements. The operation commands for inputting arrangements are displayed together with the number of display apparatuses 2 to be arranged. The user performs the same operation on each of the display apparatuses 2A to 2D, to display substantially the same operation guide 500.

If the user selects one of the operation commands 510, as illustrated in FIG. 40B, each of the display apparatuses 2 displays arrangement determination buttons 560. As the arranged position of the display apparatus 2A is (1,1), the user presses the upper left box from among the arrangement determination buttons 560. As the arranged position of the display apparatus 2B is (1,2), the user presses the upper right box from among the arrangement determination buttons 560. As the arranged position of the display apparatus 2C is (2,1), the user presses the lower left box from among the arrangement determination buttons 560. As the arranged position of the display apparatus 2D is (2,2), the user presses the lower right box from among the arrangement determination buttons 560.

In this way, each of the display apparatuses 2A to 2D can obtain the arranged position of its own. Also, as having an arranged position at (1,1), the display apparatus 2A can determine that it is the master display.

Each of the display apparatuses 2A to 2D that receives the arranged position holds a corresponding flag=ON in substantially the same way as the other detected states of the display apparatuses. In the case where the flag is ON, even if not having (or not having detected) an infrared I/F 223, in response to handwritten data, each of the display apparatuses 2A to 2D displays operation commands related to functions of displaying data using the multiple display apparatuses 2. Each of the display apparatuses 2A to 2D can display its own IP address. The user inputs the IP address of each sub-display into the master display.

<Main Effects>

As described above, in the display apparatus 2 in the present embodiment, by writing by hand a defined keyword for the multi-displaying, the user can easily enable the multi-displaying function or change the operation mode. The provider or the user of the display apparatus 2 can set defined keywords that can be understood intuitively as operation commands. For example, the name of an operation mode or an aspect of displaying may be set as a defined keyword. In the case where no other display apparatus 2 is detected, no operation command related to the multi-displaying is displayed; therefore, the operation guide 500 can be used effectively, such that displaying of operation commands that are not selectable is suppressed.

Therefore, the number of operations and steps required for enabling the multi-displaying function or changing the operation mode can be reduced, and the degrees of freedom of an operation menu increase; therefore, the design and the operability can be improved. Only operation commands that match a defined keyword written by hand by the user are displayed; therefore, displaying of operation commands that would be far from the desire of the user can be excluded. Icons, deeply hierarchical operation menus, and the like become unnecessary, and thereby, the degrees of freedom when designing operation menus increase.

Application Example 2

In the following application examples, other examples of configurations of the display apparatus 2 will be described.

<Another Example 1 of Configuration of Display Apparatus>

Although a display apparatus 2 in the present embodiment will be described as having a large touch panel, the display apparatus 2 is not limited to those having a touch panel.

Figure 41A:
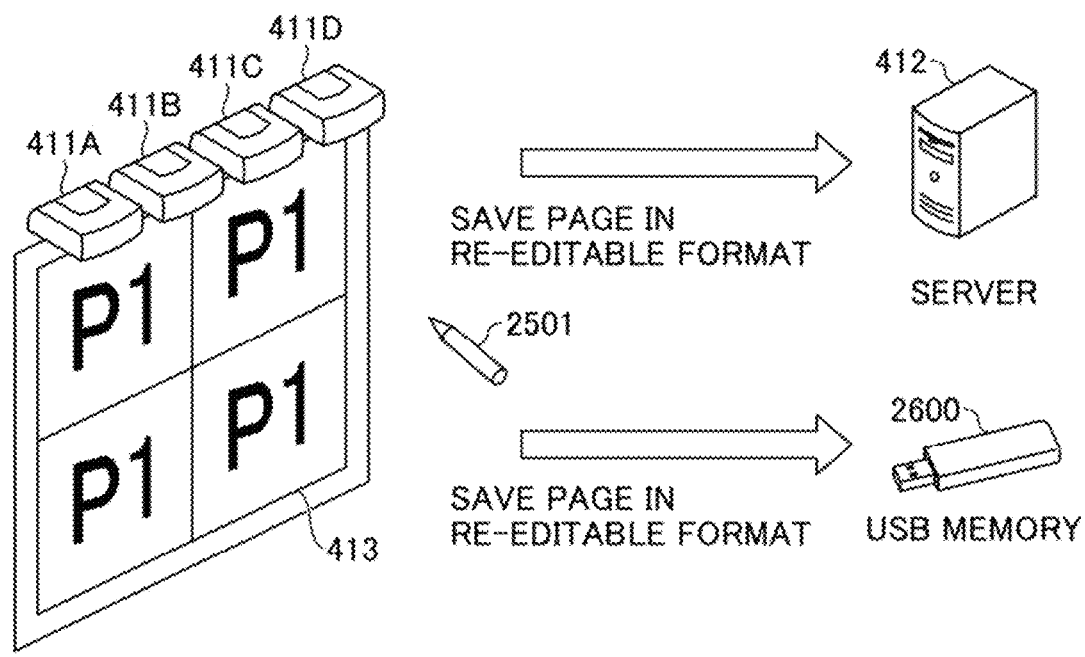
FIGS. 41A to 41C are diagrams illustrating another example of a configuration of a display apparatus.
Figure 41B:
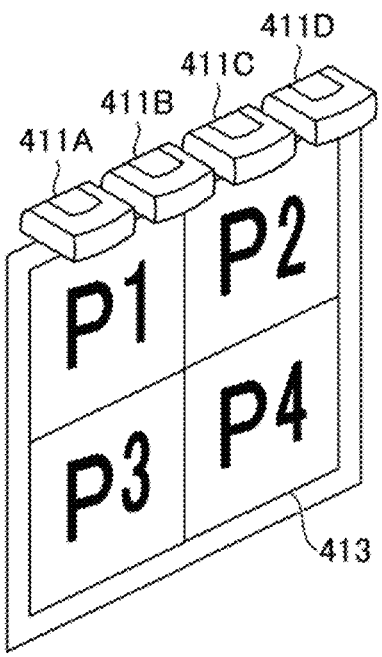
Figure 41C:
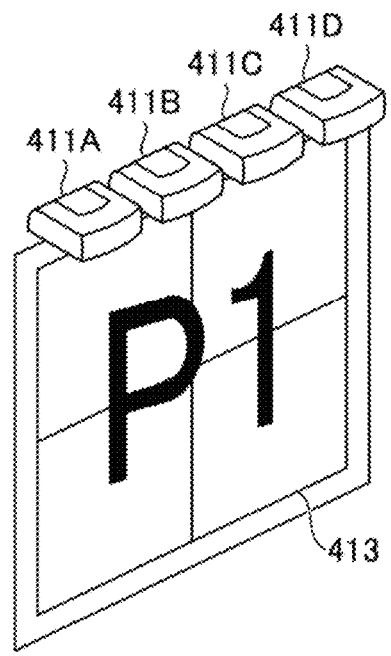

FIGS. 41A to 41C are diagrams illustrating another example of a configuration of the display apparatus 2. In FIGS. 41A to 41C, four projectors 411A to 411D are installed along the upper side a typical whiteboard 413. These projectors 411A to 411D correspond to display apparatuses 2. The typical whiteboard 413 is not a flat panel display integrated with a touch panel, but a whiteboard on which the user directly performs writing by hand with a marker. Note that the whiteboard may be a blackboard, and simply needs to have a flat surface large enough to project a video.

Each of the four projectors 411A to 411D has an ultra-short focus optical system, and can project a video having little distortion onto the whiteboard 413 from a distance around 10 cm. This video may be transmitted from a PC connected wirelessly or by wire, or may be stored in the projectors 411A to 411D.

The user performs writing by hand on the whiteboard 413 using a dedicated electronic pen 2501. The electronic pen 2501 has a light emitting part, for example, at the tip, and when the user presses the electronic pen 2501 against the whiteboard 413 for writing by hand, the switch turns on to emit light. As the wavelength of the light is in a region of near-infrared or infrared, the light is invisible to the user. Each of the projectors 411A to 411D includes a camera to capture an image of the light emitting part, and analyzes the image to determine the direction of the electronic pen 2501. Also, the electronic pen 2501 emits a sound wave while emitting light, and the projectors 411A to 411D calculate the distance to the electronic pen 2501 according to the arrival time of the sound wave. The position of the electronic pen 2501 can be determined by the direction and the distance. Data written by hand is drawn (projected) at the position of the electronic pen 2501.

Among the projectors 411A to 411D, the master projector projects a menu having various buttons; therefore, when the user presses one of the buttons with the electronic pen 2501, the master projector identifies the pressed button based on the position of the electronic pen 2501 and an on signal of the switch.

The projectors 411A to 411D are attached to a jig for fixture provided on the top of the whiteboard 413. Like the display apparatus 2, each projector detects another projector using infrared rays or the like. The master projector may be, for example, the leftmost projector 411A. As the locations of the projectors 411B and 411C are unknown to each other, the user may intervene to set the locations. It is determined in advance which regions of the whiteboard 413 are projected by the projectors 411A to 411D. The user then uses a method of adjusting the multi-projection to adjust projected images on the projectors 411A to 411D. A known method of adjusting the multi-projection can be used, for example, a method in which a pattern video projected by the projectors 411A to 411D is imaged by a camera to detect overlapping ranges and to correct distortion.

The master projector saves handwritten information in a predetermined server 412, a USB memory 2600, or the like. Handwritten information is saved page by page in a form of preserving coordinates as they are, not in a form of image data; therefore, the user can re-edit the pages.

FIG. 41A illustrates an example of a screen displayed by the four projectors 411A to 411D in the case where an operation command referred to as Cloning is executed. FIG. 41B illustrates an example of a screen displayed by the four projectors 411A to 411D in the case where an operation command referred to as Multi-paging is executed. FIG. 41C illustrates an example of a screen displayed by the four projectors 411A to 411D in the case where an operation command referred to as Tiling is executed. As such, the present embodiment can also be applied to the case where the four projectors 411A to 411D display a screen.

Application Example 3

<Another Example 2 of Configuration of Display Apparatus>

Figure 42A:
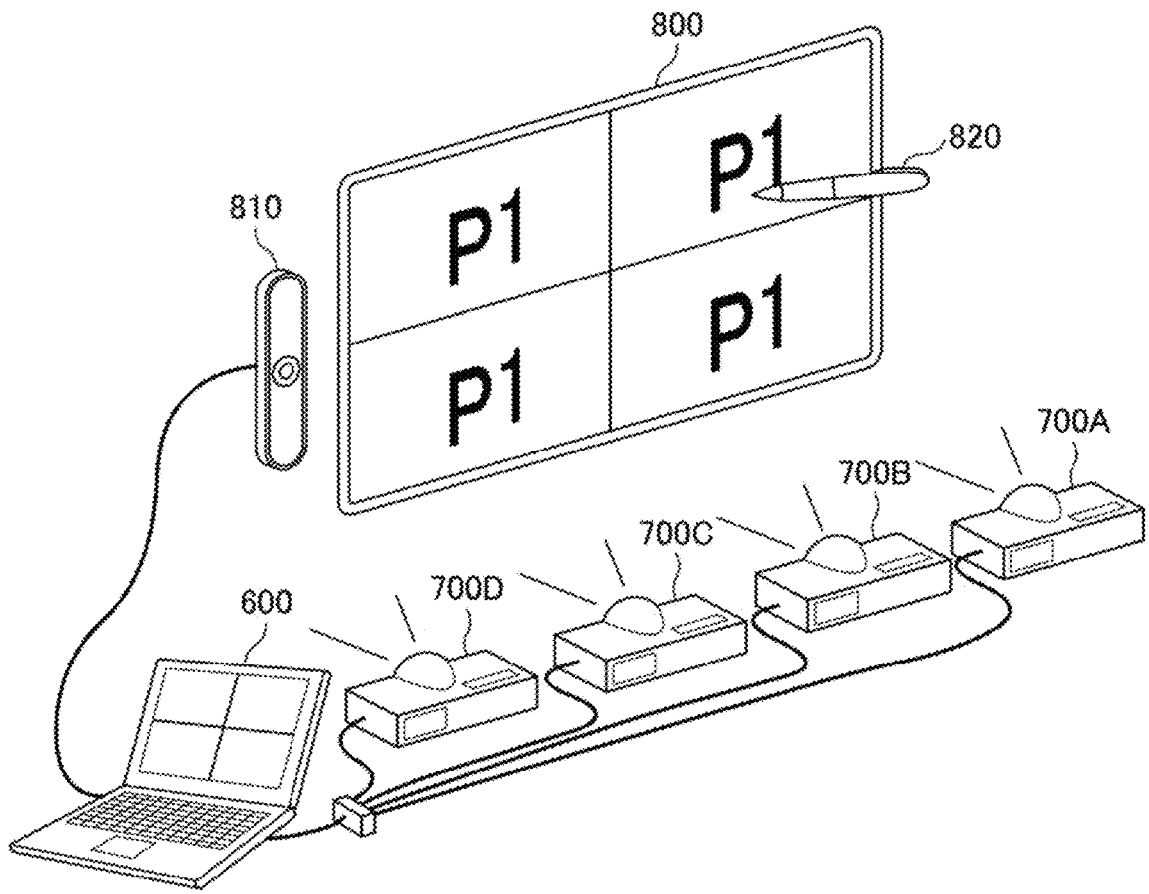
FIGS. 42A to 42C are diagrams illustrating another example of a configuration of a display apparatus.
Figure 42B:
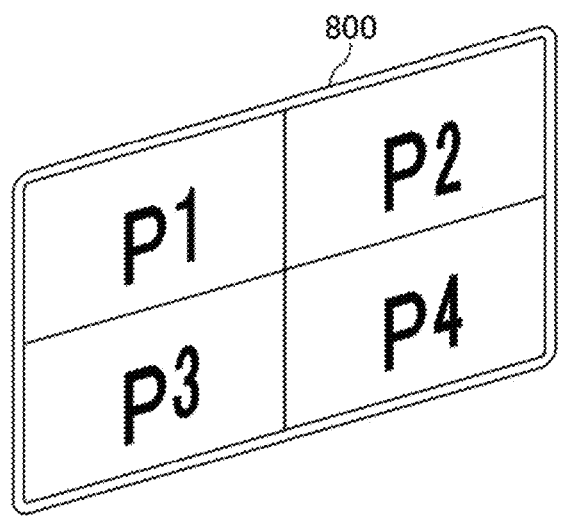
Figure 42C:
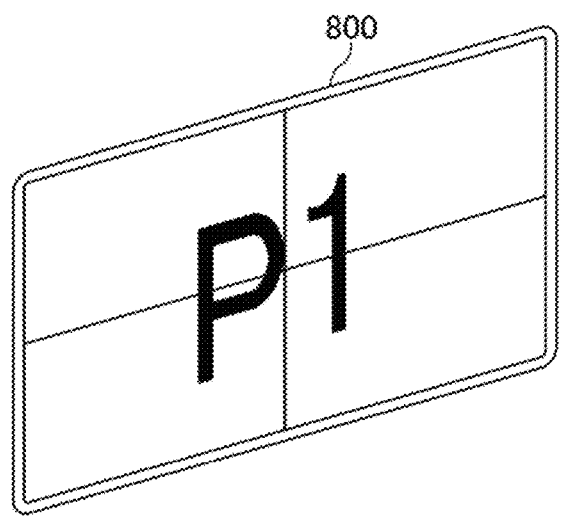

FIGS. 42A to 42C are diagrams illustrating another example of a configuration of the display apparatus 2. In the example in FIG. 42, the display apparatus 2 includes a terminal device 600, image projection devices 700A to 700D, and a pen operation detecting device 810.

The terminal device 600 is connected by wire to the image projection devices 700A to 700D and to the pen operation detecting device 810. The image projection devices 700A to 700D project image data input through the terminal device 600 onto a screen 800. The user arranges the image projection devices 700A to 700D, and roughly adjusts the respective projection ranges. For example, an adjustment may be performed such that projection is executed by the image projection device 700A in the upper right, by the image projection device 700B in the lower right, by the image projection device 700C in the upper left, and by the image projection device 700D in the lower left. The user then uses a method of adjusting the multi-projection to adjust images projected by the image projection devices 700A to 700D.

In this case, the terminal device 600 as the master display issues a command to each of the image projection devices 700A to 700D to execute an operation command along with a display range.

The pen operation detecting device 810 communicates with the electronic pen 820, to detect operations using the electronic pen 820 in the vicinity of the screen 800. Specifically, on the screen 800, the electronic pen 820 detects coordinate information representing points designated by the electronic pen 820 (the detection method may be the same as that in FIGS. 41A to 41C), and transmits the information to the terminal device 600.

Based on the coordinate information received from the pen operation detecting device 810, the terminal device 600 generates image data of handwritten data input with the electronic pen 820, and causes the image projection devices 700A to 700D to project the image of the handwritten data on the screen 800.

Also, the terminal device 600 generates superimposed image data representing a superimposed image in which a background image projected by the image projection devices 700A to 700D is superimposed with the image of the handwritten data input by the electronic pen 820.

FIG. 42A illustrates an example of a screen displayed by the four image projection devices 700A to 700D in the case where an operation command referred to as Cloning is executed. FIG. 42B illustrates an example of a screen displayed by the four image projection devices 700A to 700D in the case where an operation command referred to as Multi-paging is executed. FIG. 42C illustrates an example of a screen displayed by the four image projection devices 700A to 700D in the case where an operation command referred to as Tiling is executed. As such, the present embodiment can also be applied to the case where the four image projection devices 700A to 700D display a screen.

Application Example 4

<Another Example 3 of Configuration of Display Apparatus>

Figure 43A:
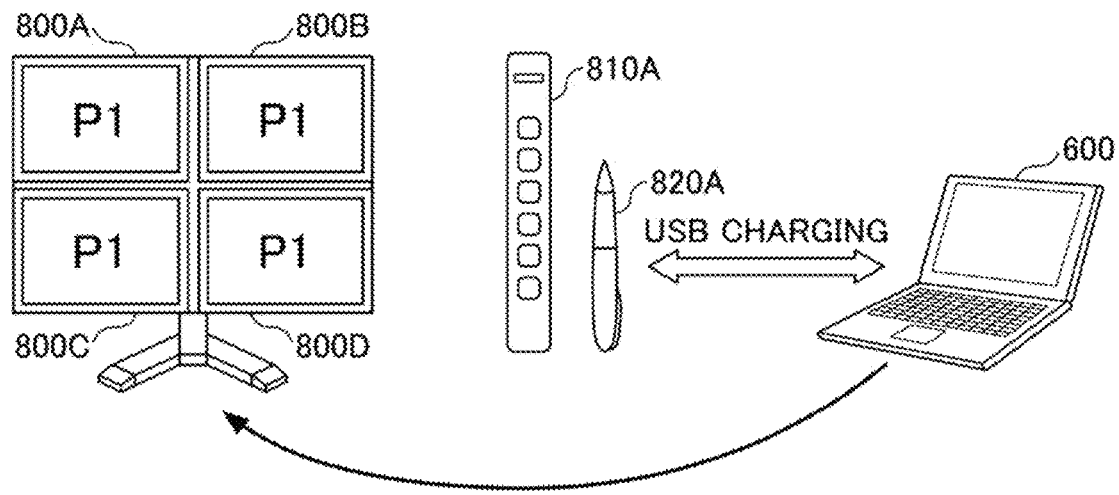
FIGS. 43A to 43C are diagrams illustrating another example of a configuration of a display apparatus.
Figure 43B:
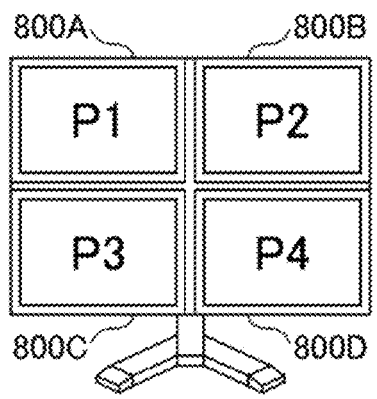
Figure 43C:
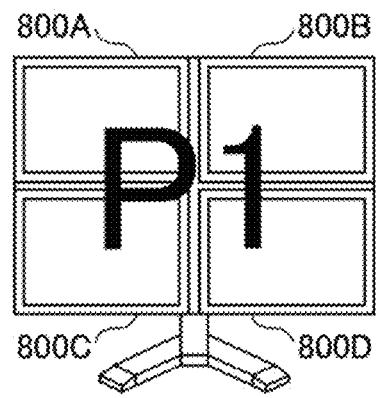

FIGS. 43A to 43C are diagrams illustrating an example of a configuration of the display apparatus 2. In the example in FIGS. 43A to 43C, the display apparatus 2 includes a terminal device 600, displays 800A to 800D, and a pen operation detecting device 810A. The displays 800A to 800D are mounted on a monitor stand and arrayed closely. In this case, the terminal device 600 as the master display issues a command to each of the displays 800A to 800D to execute an operation command along with a display range. The method of detecting the arrangement of the respective displays 800A to 800D may be the same as in the case of the display apparatus 2.

The pen operation detecting device 810A is arranged in the vicinity of the displays 800A to 800D, detects coordinate information representing points designated by an electronic pen 820A (the detection method may be the same as that in FIGS. 41A to 41C) on the displays 800A to 800D, and transmits the information to the terminal device 600. Note that in the example in FIGS. 43A to 43C, the electronic pen 820A may be charged by the terminal device 600 via a USB connector.

Based on the coordinate information received from the pen operation detecting device 810A, the terminal device 600 generates image data of the handwritten data input with the electronic pen 820A, and causes the displays 800A to 800D to display the image data.

FIG. 43A illustrates an example of a screen displayed by the four displays 800A to 800D in the case where an operation command referred to as Cloning is executed. FIG. 43B illustrates an example of a screen displayed by the four displays 800A to 800D in the case where an operation command referred to as Multi-paging is executed. FIG. 43C illustrates an example of a screen displayed by the four displays 800A to 800D in the case where an operation command referred to as Tiling is executed. As such, the present embodiment can also be applied to the case where the four displays 800A to 800D display a screen.

Application Example 5

<Another Example 4 of Configuration of Display Apparatus>

Figure 44A:
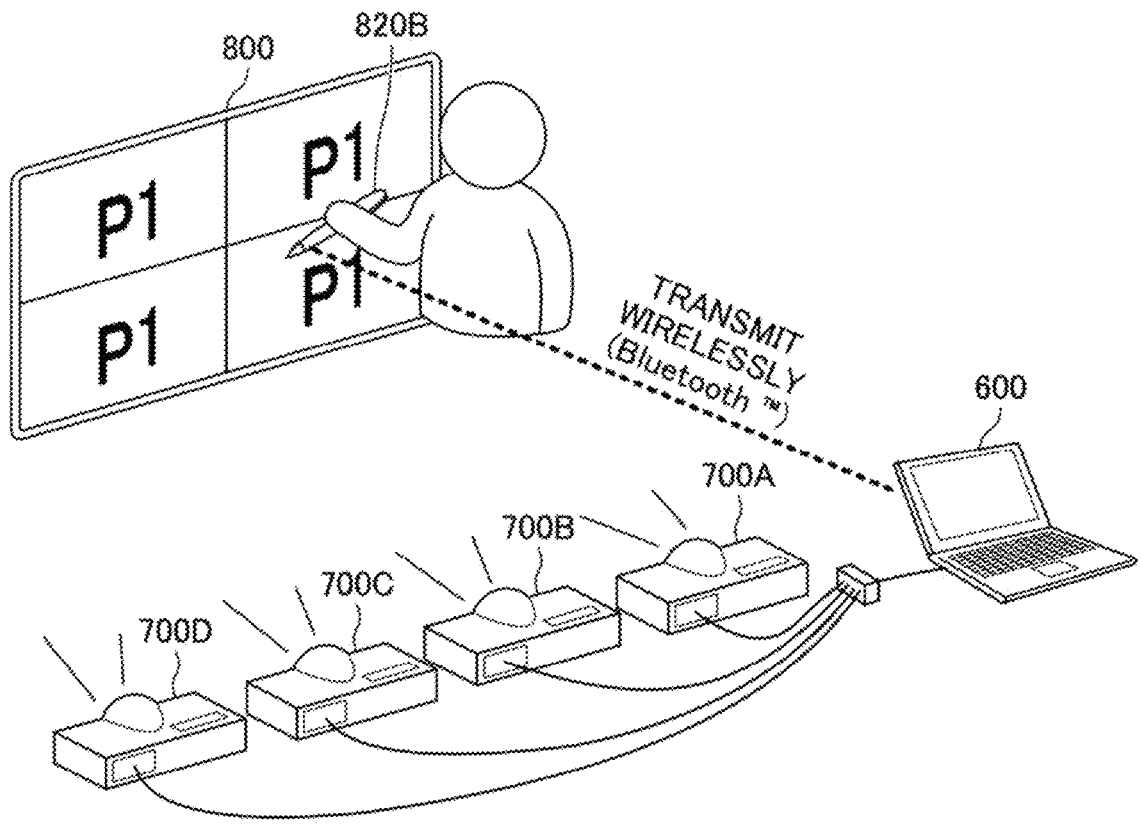
FIGS. 44A to 44C are diagrams illustrating another example of a configuration of a display apparatus.
Figure 44B:
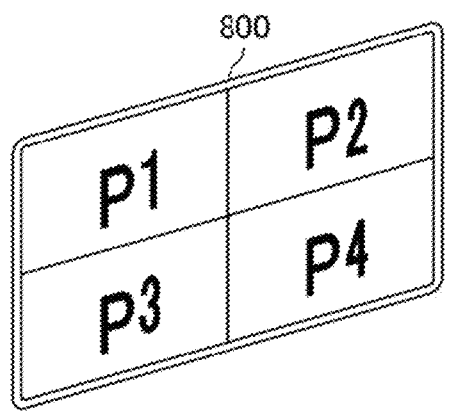
Figure 44C:
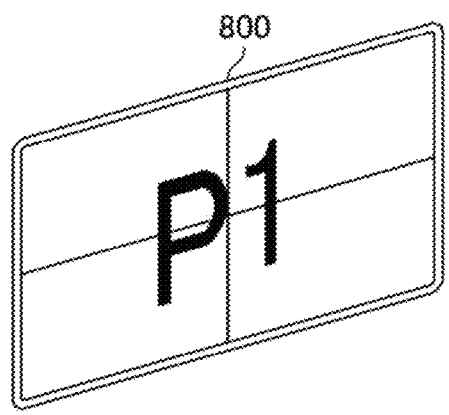

FIGS. 44A to 44C are diagrams illustrating an example of a configuration of the display apparatus 2. In the example in FIG. 44, the display apparatus 2 includes a terminal device 600 and four image projection devices 700A to 700D. In this case, the terminal device 600 as the master display issues a command to each of the image projection devices 700A to 700D to execute an operation command along with a display range. The projection method of the image projection devices 700A to 700D may be the same as that in FIGS. 42A to 42C.

The terminal device 600 communicates wirelessly (Bluetooth (registered trademark), etc.) with an electronic pen 820B, to receive coordinate information on points designated by the electronic pen 820B on the screen 800. The coordinate information may be read by the electronic pen 820B as fine positional information formed on the screen 800, or the coordinate information may be received from the screen 800.

Further, based on the received coordinate information, the terminal device 600 generates image data of an image of handwriting data input by the electronic pen 820B. The terminal device 600 causes the image projection devices 700A to 700D to project the image of the handwritten data.

Also, the terminal device 600 generates superimposed image data representing a superimposed image in which a background image projected by the image projection devices 700A to 700D is superimposed with the image of the handwritten data input by the electronic pen 820.

FIG. 44A illustrates an example of a screen displayed by the four image projection devices 700A to 700D in the case where an operation command referred to as Cloning is executed. FIG. 44B illustrates an example of a screen displayed by the four image projection devices 700A to 700D in the case where an operation command referred to as Multi-paging is executed. FIG. 44C illustrates an example of a screen displayed by the four image projection devices 700A to 700D in the case where an operation command referred to as Tiling is executed. As such, the present embodiment can also be applied to the case where the four image projection devices 700A to 700D display a screen.

As described above, the embodiments described above can be applied to various system configurations.

Other Application Examples

As described above, the best form for implementing the present invention has been described using the application examples; note that the present invention is not limited to such application examples, and various modifications and substitutions can be made within a scope that does not deviate from the subject matter of the present invention.

For example, although the multiple display apparatuses 2 communicate with one another in the present embodiment, multiple displays may be connected to a single information processing apparatus to communicates with one another. Also, in the case where the display apparatus 2 does not have a touch panel, writing by hand may be performed using a mouse or trackball (types of pointing devices used for operating a computer, like a mouse).

Also, in the present embodiment, although operation commands related to the multi-displaying is displayed in response to input of handwritten data, a defined keyword may be input using a keyboard, to have operation commands related to the multi-displaying displayed on the display apparatus 2.

For example, although the present embodiment has been described taking an electronic blackboard as an example, the electronic blackboard may be referred to as an electronic whiteboard, an electronic information board, or the like. Also, the present embodiment can be suitably applied to any information processing apparatus as long as it has a touch panel. As the information processing apparatus having a touch panel, for example, a projector (PJ), an output device such as a digital signage, a head-up display (HUD) device, an industrial machine, an imaging device, a sound collecting device, a medical device, a network home appliance, a personal computer (PC), a cellular phone, a smartphone, a tablet terminal, a game machine, a personal digital assistant (PDA), a digital camera, a wearable PC, and a desktop PC may be enumerated.

Also, in the present embodiment, although coordinates of the tip of a pen are detected by a method of detection using a touch panel, the coordinates of the tip of the pen may be detected by ultrasonic waves. In this case, the pen emits ultrasonic waves while emitting light, and the display apparatus 2 calculates the distance according to the arrival time of the ultrasonic waves. The position of the pen can be determined by the direction and the distance. The projector draws (projects) a path of the pen as stroke data.

Also, in the examples as illustrated in FIG. 6A and the like, the configuration is partitioned according to the primary functions, to facilitate understanding of the processing executed by the display apparatus 2. The invention of the present application is not limited by the manner of partitioning or the nomenclature of the processing units. The processing executed by the display apparatus 2 can be further partitioned into a greater number of processing units depending on the contents of processing. Also, partitioning can be made so as to have one processing unit include more processing steps.

Also, part of the processing executed by the display apparatus 2 may be executed by a server connected to the display apparatus 2 via a network.

Also, in the present embodiment, even when a threshold value is exemplified for comparison, the threshold value is not limited to the exemplified value. Therefore, in the present embodiment, for every threshold value, the wording of less than the threshold value has a similar meaning to the wording of less than or equal to the threshold value, and the wording of exceeding the threshold value has a similar meaning to the greater than or equal to the threshold value. For example, the wording of less than the threshold value in the case of the threshold value being 11 has a similar meaning to the wording of less than or equal to a threshold value in the case of the threshold value being 10. Also, the wording of less than the threshold value in the case of the threshold value being 11 has a similar meaning to the wording of less than or equal to a threshold value in the case of the threshold value being 10.

Also, the functions of the embodiment described above can be implemented by one or more processing circuits. Here, in the present specification, the "processing circuit" includes various devices, a processor that is programmed to execute functions by software such as a processor implemented by an electronic circuit; an application specific integrated circuit (ASIC), a digital signal processor (DSP), and a field programmable gate array (FPGA) designed to execute the functions described above; and a devices such as a conventional circuit modules or the like.

The contact position detection unit 21 is an example of a processor executing receiving. The configuration detection unit 32 is an example of the processor executing detecting. The display control unit 26 is an example of the processor executing displaying. The operation reception unit 29 is an example of the processor executing receiving a selection. The multi-display control unit 33 is an example of the processor executing predetermined processing. The network communication unit 28 is an example of the processor executing receiving via a communication device.

Also, instructions for implementing the functions of the embodiment described above can be recorded on a non-transitory computer-readable recording medium having the computer-readable instructions stored thereon, which when executed, cause a display apparatus that displays handwritten data and includes a display, a memory, and a processor, to execute a method comprising: receiving as input the handwritten data; detecting one or more secondary display apparatuses; displaying, in a case where the one or more secondary display apparatuses are detected by the detecting, on a display of the display apparatus, an operation command related to a function of displaying data by using the display apparatus and the one or more secondary display apparatuses, based on the handwritten data received by the receiving; and predetermined processing related to the function, in response to receiving an operation performed by a user with respect to the operation command.

What is claimed is:

1. A display apparatus that displays handwritten data, comprising:
    a display;
    a memory; and
    a processor configured to execute
    receiving as input the handwritten data;
    detecting one or more secondary display apparatuses;
    displaying, in a case where the one or more secondary display apparatuses are detected by the detecting, on the display of the display apparatus, an operation command related to a function of displaying data by using the display apparatus and the one or more secondary display apparatuses, based on the handwritten data received by the receiving, the operation command including enabling multi-displaying of the display and the one or more secondary display apparatuses, or changing an operation mode of the display and the one or more secondary display apparatuses; and predetermined processing related to the function, in response to receiving an operation performed by a user with respect to the operation command, wherein:

the function of displaying includes multi-paging, and the operation performed by the user causes the predetermined processing to cause multi-paging of the display and the one or more secondary display.

2. The display apparatus as claimed in claim 1, wherein the operation command presents an image for executing a specific process defined in advance.

3. The display apparatus as claimed in claim 2, wherein the processor is configured to further execute receiving a selection of the operation command selected from among operation commands displayed on the display of the display apparatus, or receiving, via a communication device, the operation command displayed on a secondary display apparatus from among the one or more secondary display apparatuses and selected on the secondary display apparatus from the secondary display apparatus, wherein in response to receiving the selection of the operation command on the display of the display apparatus, the predetermined processing transmits a command to control data to be displayed on the one or more secondary display apparatuses according to the operation command, to the one or more secondary display apparatuses.

4. The display apparatus as claimed in claim 3, wherein the displaying displays the data in units of pages, and wherein the predetermined processing transmits a page number corresponding to the operation command received by the receiving of the selection or the receiving via the communication device, to each of the one or more secondary display apparatuses.

5. The display apparatus as claimed in claim 4, wherein the detecting further detects another display apparatus detected by the secondary display apparatus through the one or more secondary display apparatuses, and detects an arrangement of a plurality of display apparatuses including the one or more secondary display apparatuses and said another display apparatus, and wherein the predetermined processing transmits at least one of a page or a display range according to the arrangement of the plurality of display apparatuses and the operation command, to each of the plurality of display apparatuses.

6. The display apparatus as claimed in claim 3, wherein in a case where the operation command received by the receiving of the selection or the receiving via the communication device is an operation command to have the display apparatus and the one or more secondary display apparatuses display a same page, the predetermined processing transmits a command to the one or more secondary display apparatuses to display the same page as a page being displayed on the display apparatus, in a same display range.

7. The display apparatus as claimed in claim 3, wherein in a case where the operation command received by the receiving of the selection or the receiving via the communication device is an operation command to display different pages by the display apparatus and the one or more secondary display apparatuses display, respectively, the predetermined processing determines a page number for each of the one or more secondary display apparatuses according to an arrangement of the one or more secondary display apparatuses, by incrementing a page number of the page being displayed on the display apparatus one by one, and transmits each incremented page number to be displayed on said each of the one or more secondary display apparatuses, to said each of the one or more secondary display apparatuses.

8. The display apparatus as claimed in claim 7, wherein in a case where the operation command received by the receiving of the selection or the receiving via the communication device is an operation command to specify an order of respective pages to be displayed on the display apparatus and the one or more secondary display apparatuses, the predetermined processing determines a page number to be displayed on said each of the one or more secondary display apparatuses for said each of the one or more secondary display apparatuses according to the arrangement of the one or more secondary display apparatuses and the operation command, and transmits the determined page number to be displayed on said each of the one or more secondary display apparatuses to said each of the one or more secondary display apparatuses.

9. The display apparatus as claimed in claim 7, wherein in a case where the operation command received by the receiving of the selection or the receiving via the communication device is an operation command to turn pages to be displayed on the display apparatus and the one or more secondary display apparatuses, the predetermined processing determines the page number to be displayed on said each of the one or more secondary display apparatuses to be greater than the page number being displayed on the display apparatus according to the arrangement of the one or more secondary display apparatuses and the operation command, and transmits the determined page number to be displayed on said each of the one or more secondary display apparatuses to said each of the one or more secondary display apparatuses.

10. The display apparatus as claimed in claim 3, wherein in a case where the operation command received by the receiving of the selection or the receiving via the communication device is an operation command to display one page on a entirety of the display, apparatus and the one or more secondary display apparatuses, the predetermined processing determines a display range for each of the one or more secondary display apparatuses in a case where a page being displayed on the display apparatus is to be displayed over the entirety of the display apparatus and the one or more secondary display apparatuses according to an arrangement of the one or more secondary display apparatuses, and transmits the determined display range to said each of the one or more secondary display apparatuses.

11. The display apparatus as claimed in claim 10, wherein in a case where the operation command received by the receiving of the selection or the receiving via the communication device is an operation command to enlarge an image, in a case where said each of the one or more secondary display apparatuses displays a page, the predetermined processing transmits a display range in a case where the page being displayed on said each of the one or more secondary display apparatuses is enlarged, to said each of the one or more secondary display apparatuses, and in a case where a entirety of the display apparatus and the one or more secondary display apparatuses display one page, the predetermined processing determines a display range to be displayed on said each of the one or more secondary display apparatuses in a case where the one page is enlarged according to the arrangement of the one or more secondary display apparatuses, and transmits the determined display range to said each of the one or more secondary display apparatuses.

12. The display apparatus as claimed in claim 10, wherein in a case where the operation command received by the receiving of the selection or the receiving via the communication device is an operation command to specify a sheet size and to display at least one page on a entirety of the display apparatus and the one or more secondary display apparatuses, the predetermined processing determines a number of pages that can be displayed in the sheet size, determines, in a case where each page is displayed in the sheet size on the display apparatus and the one or more secondary display apparatuses, a display range to be displayed on each of the display apparatus and the one or more secondary display apparatuses according to the arrangement of the one or more secondary display apparatuses and the operation command, and transmits the determined display range to said each of the one or more secondary display apparatuses.

13. The display apparatus as claimed in claim 1, wherein:
the function of displaying includes cloning, and
the operation performed by the user causes the predetermined processing to cause cloning of the display and the one or more secondary display.

14. A display method executed by a display apparatus that displays handwritten data and includes a display, a memory, and a processor, the method comprising:

receiving as input the handwritten data;

detecting one or more secondary display apparatuses;

displaying, in a case where the one or more secondary display apparatuses are detected by the detecting, on the display of the display apparatus, an operation command related to a function of displaying data by using the display apparatus and the one or more secondary display apparatuses, based on the handwritten data received by the receiving, the operation command including enabling multi-displaying of the display and the one or more secondary display apparatuses, or changing an operation mode of the display and the one or more secondary display apparatuses; and predetermined processing related to the function, in response to receiving an operation performed by a user with respect to the operation command, wherein:
the function of displaying includes multi-paging, and
the operation performed by the user causes the predetermined processing to cause multi-paging of the display and the one or more secondary display.

15. The display method as claimed in claim 14, wherein:
the function of displaying includes cloning, and
the operation performed by the user causes the predetermined processing to cause cloning of the display and the one or more secondary display.

16. A display system in which a plurality of display apparatuses that display handwritten data communicate with one another, wherein each of the plurality of display apparatuses includes receiving as input the handwritten data, and detecting one or more secondary display apparatuses, displaying, in a case where the one or more secondary display apparatuses are detected by the detecting, to display on a display of said each of the plurality of display apparatuses an operation command related to a function of displaying data by using the plurality of display apparatuses, based on the handwritten data received by the receiving, the operation command including enabling multi-displaying of the display and the one or more secondary display apparatuses, or changing an operation mode of the display and the one or more secondary display apparatuses; and predetermined processing related to the function, in response to receiving an operation performed by a user with respect to the operation command, wherein a primary display apparatus transmits, in response to receiving a selection from among operation commands, to the one or more secondary display apparatuses, a command to execute an operation command related to the function with respect to data to be displayed on the one or more secondary display apparatuses, wherein each of the one or more secondary display apparatuses, in response to receiving the command to execute the operation command related to the function with respect to the data to be displayed on said each of the one or more secondary display apparatuses, displays the data on a display of said each of the one or more secondary display apparatuses, wherein:
the function of displaying includes multi-paging, and
the operation performed by the user causes the predetermined processing to cause multi-paging of the display and the one or more secondary display.

17. The display system as claimed in claim 16, wherein:
the function of displaying includes cloning, and
the operation performed by the user causes the predetermined processing to cause cloning of the display and the one or more secondary display.

* * * * *